(12) United States Patent
Shin

(10) Patent No.: US 7,695,144 B2
(45) Date of Patent: Apr. 13, 2010

(54) OPTICAL SYSTEM OF PORTABLE PROJECTOR AND MOBILE COMMUNICATION TERMINAL USING THE SAME

(75) Inventor: Sung-Chul Shin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 11/430,173

(22) Filed: May 9, 2006

(65) Prior Publication Data
US 2006/0250532 A1    Nov. 9, 2006

(30) Foreign Application Priority Data

| May 9, 2005 | (KR) | .................. 10-2005-0038394 |
| Aug. 31, 2005 | (KR) | .................. 10-2005-0080894 |
| Aug. 31, 2005 | (KR) | .................. 10-2005-0080895 |
| Aug. 31, 2005 | (KR) | .................. 10-2005-0080897 |
| Aug. 31, 2005 | (KR) | .................. 10-2005-0080898 |
| Aug. 31, 2005 | (KR) | .................. 10-2005-0080899 |
| Sep. 27, 2005 | (KR) | .................. 10-2005-0089974 |
| Sep. 29, 2005 | (KR) | .................. 10-2005-0091338 |

(51) Int. Cl.
*G03B 21/28* (2006.01)
(52) U.S. Cl. .......................... 353/98; 353/94; 353/99
(58) Field of Classification Search .......... 353/39, 353/94, 98, 99, 122; 359/15, 16, 17, 18, 359/19, 20, 27, 31, 34, 558, 559, 560, 561, 359/562, 563, 564, 565, 566, 567, 568, 569, 359/570, 571, 572, 573, 574, 575, 576
See application file for complete search history.

(56) References Cited

U.S. PATENT DOCUMENTS

| 4,704,000 | A | * | 11/1987 | Pekar et al. ................. 359/482 |
| 4,711,512 | A |   | 12/1987 | Upatnieks et al. |
| 5,224,198 | A | * | 6/1993 | Jachimowicz et al. ....... 385/133 |
| 5,369,415 | A | * | 11/1994 | Richard et al. .................. 345/6 |
| 5,465,311 | A | * | 11/1995 | Caulfield et al. .............. 385/27 |
| 5,821,911 | A |   | 10/1998 | Jachimowicz |
| 6,580,529 | B1 | * | 6/2003 | Amitai et al. .................. 359/13 |
| 6,821,457 | B1 | * | 11/2004 | Natarajan et al. ........... 252/582 |
| 2003/0048422 | A1 | * | 3/2003 | Lowenthal et al. ............ 353/31 |
| 2004/0004767 | A1 | * | 1/2004 | Song .......................... 359/566 |

(Continued)

FOREIGN PATENT DOCUMENTS

EP    0 535 402 A1    4/1993

(Continued)

*Primary Examiner*—Georgia Y Epps
*Assistant Examiner*—Bao-Luan Le
(74) *Attorney, Agent, or Firm*—Birch, Stewart, Kolasch & Birch, LLP

(57) ABSTRACT

An optical system of a portable projector and a mobile communication terminal using the same are disclosed. The optical system comprises a light transmission member having first and second surfaces, a light source device for emitting light beams onto the first surface of the member, so as to allow the light beams to be transmitted into the member, and one or more optical elements supported on at least one of the first and second surfaces of the member for diffracting the light beams incident from the light source device into the member, and subsequently reproducing and emitting an image from the diffracted light beams, to the outside of the member.

34 Claims, 19 Drawing Sheets

U.S. PATENT DOCUMENTS

| | | | |
|---|---|---|---|
| 2004/0056977 A1* | 3/2004 | Kim | 348/376 |
| 2005/0007562 A1* | 1/2005 | Seki et al. | 353/98 |
| 2005/0013606 A1* | 1/2005 | Yang et al. | 396/429 |
| 2005/0117837 A1 | 6/2005 | Cerato | |
| 2006/0017887 A1* | 1/2006 | Jacobson et al. | 353/30 |
| 2006/0187419 A1* | 8/2006 | Yavid | 353/43 |
| 2006/0187423 A1* | 8/2006 | Hamilton et al. | 353/79 |

FOREIGN PATENT DOCUMENTS

| | | |
|---|---|---|
| EP | 1215522 A2 | 6/2002 |
| EP | 1722254 A2 | 11/2006 |
| JP | 3-84538 A | 4/1991 |
| WO | WO-2005/054929 A2 | 6/2005 |

* cited by examiner

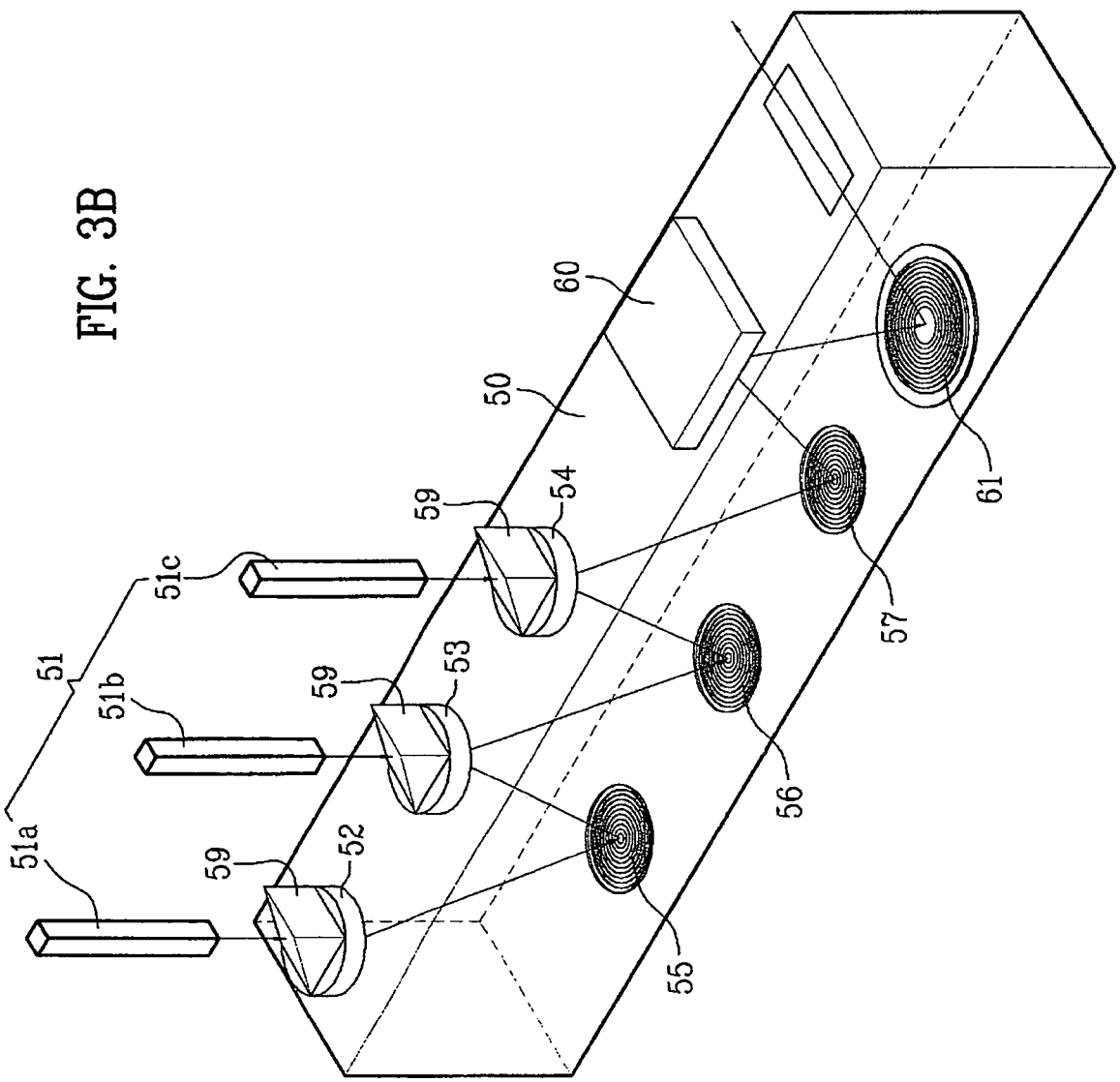

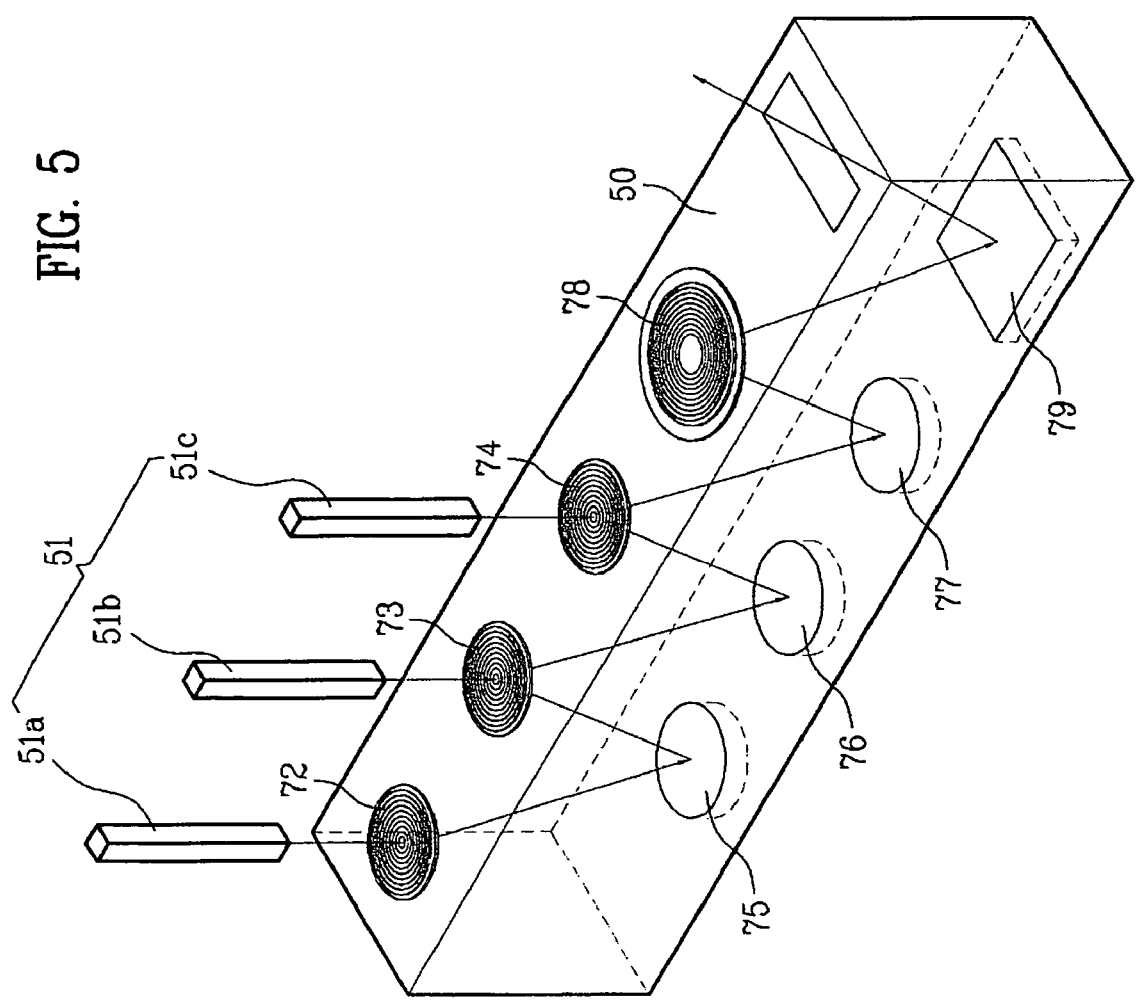

OPTICAL SYSTEM OF PORTABLE PROJECTOR AND MOBILE COMMUNICATION TERMINAL USING THE SAME

This application claims the benefit of the Korean Patent Application No. 10-2005-0038394 filed on May 9, 2005, 10-2005-0080894 filed on Aug. 31, 2005 10-2005-0080895 filed on Aug. 31, 2005, 10-2005-0080899 filed on Aug. 31, 2005, 10-2005-0080898 filed on Aug. 31, 2005, 10-2005-0080897 filed on Aug. 31, 2005, 10-2005-0089974 filed on Sep. 27, 2005 and 10-2005-0091338 filed on Sep. 29, 2005 which is hereby incorporated by reference as if fully set forth herein.

BACKGROUND OF THE INVENTION

1. Field of the Invention

The present invention relates to an optical system of a projector, and more particularly, to an optical system of a portable projector and a mobile communication terminal using the same.

2. Discussion of the Related Art

The recent tendency of display devices is to provide a large screen size as well as lightness and thinness. Of such display devices, projectors have been greatly highlighted because they can realize a large screen of 100 inches or more.

Such a projector is a display device which projects an image generated from a micro device such as a liquid crystal display (LCD) panel, a reflective liquid crystal on silicon (LCOS) panel, or a digital micro-mirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a double panel type projector, white light is separated into color light components in a space-division and time-division manner, and the color light components are illuminated to two micro devices. In a triple panel type projector, white light is separated into color light components in a space-division manner, and the color light components are illuminated to three micro devices.

FIG. 1 is a schematic view illustrating an arrangement of a general single panel type projector. FIG. 2 is a perspective view illustrating an arrangement of a general triple panel type projector.

As shown in FIG. 1, the single panel type projector includes a light source 2, a color drum 3, a rod lens 4, illumination lenses 5 and 6, a micro device 7, a prism 8, and a projection lens unit 1.

In the illustrated single panel type projector, light emitted from the light source 2 is separated into red, green, and blue light beams while passing through the color drum 3. The separated light beams are modulated to have uniform brightness while passing through the rod lens 4. The light beams are then incident on the micro device 7 after passing through the illumination lenses 5 and 6 and the prism 8.

The incident light beams have an image signal while passing through the micro device 7, and are projected on a screen after passing through the prism 8 and projection lens unit 1.

Also, as shown in FIG. 2, the triple panel type projector includes dichroic mirrors 9 to separate light emitted from the light source 2 into red, green, and blue light beams. The separated red, green, and blue light beams are incident on corresponding LCD panels 10, respectively. The incident light beams are then composed to be projected onto a screen via the projection lens unit 1.

The conventional projectors having the above-mentioned arrangement, however, have a problem in that they require not only a great number of optical elements, but also an excessively large installation space due to a three dimensional arrangement of an optical system thereof.

Such an arrangement of the optical system makes it impossible to reduce the entire size of the projector.

Also, the conventional projectors generally suffer from the loss of light because a traveling path of the light from the light source to the projection lens unit is long. Therefore, the conventional projectors have a limitation to display a bright and vivid image.

Due to the three dimensional arrangement of the optical system, furthermore, the conventional projectors have a problem in that an arrangement of optical elements is unstable.

SUMMARY OF THE INVENTION

Accordingly, the present invention is directed to an optical system of a portable projector and a mobile communication terminal using the same that substantially obviate one or more problems due to limitations and disadvantages of the related art.

An object of the present invention is to provide an optical system of a portable projector, which has a novel arrangement capable of minimizing the space of the optical system, thereby achieving a reduction in the overall size of the projector, and a mobile communication terminal using the same.

Another object of the present invention is to provide an optical system of a portable projector, which can minimize the path of light, thereby achieving a reduction in the loss of light, and a mobile communication terminal using the same.

Yet another object of the present invention is to provide an optical system of a portable projector, which can achieve a stabilized arrangement of optical elements, and a mobile communication terminal using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical system of a portable projector comprises: a light transmission member having first and second surfaces; a light source device for emitting light beams onto the first surface of the member, so as to allow the light beams to be transmitted into the member; and one or more optical elements supported on at least one of the first and second surfaces of the member for diffracting the light beams incident from the light source device into the light transmission member, and subsequently reproducing and emitting an image to the outside of the member.

Here, the light transmission member may be a glass member, transparent plastic member, or hollow member having an atmosphere or vacuum pressure interior.

The light transmission member may have linear and flat surfaces. Alternatively, of all surfaces of the light transmission member, the at least one surface on which the optical elements are supported may be raised or dented.

The light source device may be any one selected from among a laser diode, light emitting diode, and organic electroluminescence element. The light source device may be a light emitting element or light emitting element array for emitting light beams having a single wavelength or light beams having different wavelengths from each other.

Each of the optical elements may take the form of a flat plate.

In accordance with a further aspect of the present invention, there is provided an optical system of a portable projector comprising: a light transmission member having first and second surfaces; a light source device for emitting light beams onto the first surface of the member based on an external image signal, so as to allow the light beams to be transmitted into the member; one or more optical elements supported on at least one of the first and second surfaces of the member for diffracting and reflecting the light beams incident from the light source device into the member; and at least one scan mirror supported on one of the first and second surfaces of the member for scanning the light beams, diffracted and reflected from the optical elements, onto an external screen at the outside of the member, based on an external control signal.

Here, the optical elements may include: at least one light splitter supported on the first surface of the member for transmitting a specific wavelength of the light beams emitted from the light source device; and at least one lens supported on at least one of the first and second surfaces of the member for diffracting the light beams emitted from the light splitter, to emit the diffracted light beams to the scan mirror. Also, the optical system may further comprise a prism placed on a surface of the light splitter facing the light source device for changing the path of the light beams incident from the light source device.

The optical elements may include: at least one light splitter supported on the first surface of the member for transmitting a specific wavelength of the light beams emitted from the light source device; a first lens placed on a surface of the light splitter facing the light source device for diffracting the light beams emitted from the light source device; and at least one second lens supported on at least one of the first and second surfaces of the member for diffracting the light beams emitted from the light splitter, to emit the diffracted light beams to the scan mirror.

Here, a first surface of the first lens, on which the light beams are incident, may have a grating angle for converging the light beams, and a second surface of the first lens, from which the light beams are emitted, may have a grating angle for changing the path of the light beams.

The optical elements may include: at least one light splitter supported on the first surface of the member for transmitting a specific wavelength of the light beams emitted from the light source device; a first lens placed on a surface of the light splitter facing the light source device for diffracting the light beams emitted from the light source device; a plate placed on a surface of the first lens facing the light source device, and having an irregular surface pattern for removing speckle noise of the light beams emitted from the light source device; and at least one second lens supported on at least one of the first and second surfaces of the member for diffracting the light beams emitted from the light splitter, to emit the diffracted light beams to the scan mirror.

The optical system may further comprise a drive to simultaneously reciprocate the light splitter, first lens, and plate in one direction.

The optical elements may include: at least one first lens supported on the first surface of the member for diffracting the light beams emitted from the light source device; a second lens supported on the second surface of the member for composing the light beams diffracted from the first lens; a color filter supported on the first surface of the member for separating color light components of the light beam composed from the second lens; and at least one third lens supported on at least one of the first and second surfaces of the member for diffracting the light beams emitted from the color filter, to emit the diffracted light beams to the scan mirror.

In accordance with another aspect of the present invention, there is provided an optical system of a portable projector comprising: a light transmission member having first and second surfaces; a light source device for emitting light beams onto the first surface of the member, so as to allow the light beams to be transmitted into the member; one or more first optical elements supported on at least one of the first and second surfaces of the member for diffracting and reflecting the light beams incident from the light source device; at least one display element supported on at least one of the first and second surfaces of the member for reproducing an image upon receiving the light beams diffracted and reflected from the first optical elements; and at least one second optical element supported on at least one of the first and second surfaces of the member for enlarging and emitting the image reproduced from the display element.

In accordance with a further aspect of the present invention, there is provided a mobile communication terminal using an optical system, the optical system including a light transmission member and a plurality of optical elements attached to the light transmission member for reproducing and emitting an image from incident light beams, the mobile communication terminal comprising: a body having a plurality of keypads and a hole; a cover having a display panel and configured to be connected to the body; a light transmission member mounted in the body at a side surface of the body through which the hole is perforated, the light transmission member being adapted to emit the light beams reproducing the image to the outside of the body through the hole; and a light source device mounted in the body for emitting the light beams to the optical elements attached to at least one surface of the light transmission member.

In accordance with yet another aspect of the present invention, there is provided a mobile communication terminal using an optical system, the optical system including a light transmission member and a plurality of optical elements attached to the light transmission member for reproducing and emitting an image from incident light beams, the mobile communication terminal comprising: a body having a plurality of keypads; a cover having a display panel and configured to be connected to the body; a supporting member rotatably mounted to the cover; a groove formed in the supporting member in a longitudinal direction of the supporting member; a connecting piece slidable along the groove; a housing connected to one end of the connecting piece and having a hole formed at a side location thereof; a light transmission member mounted in the housing for emitting the light beams reproducing the image to the outside of the housing through the hole; and a light source device mounted in the housing for emitting the light beams to the optical elements attached to at least one surface of the light transmission member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A and 3B are perspective views illustrating an optical system of a portable projector in accordance with a first embodiment of the present invention;

FIG. 5 is a perspective view illustrating an optical system of a portable projector in accordance with a second embodiment of the present invention;

DETAILED DESCRIPTION OF THE INVENTION

Figure 1:
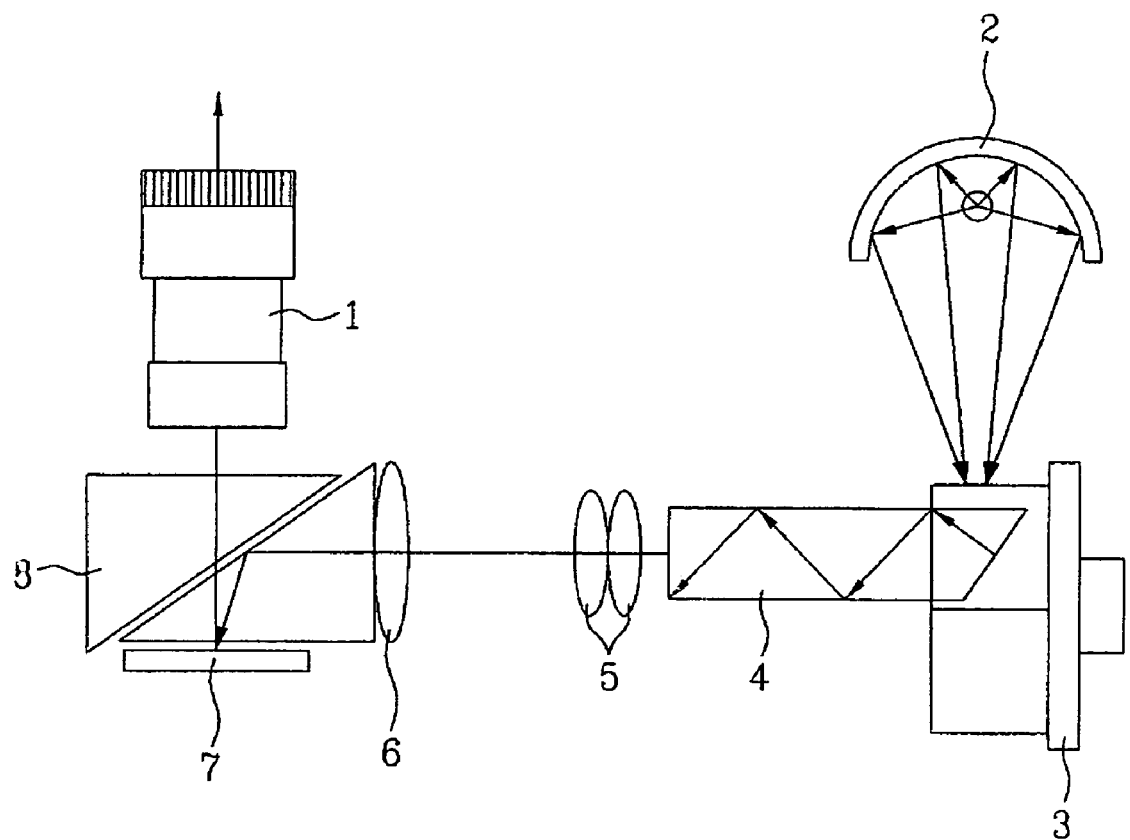
FIG. 1 is a view illustrating an arrangement of a general single panel type projector.
Figure 2:
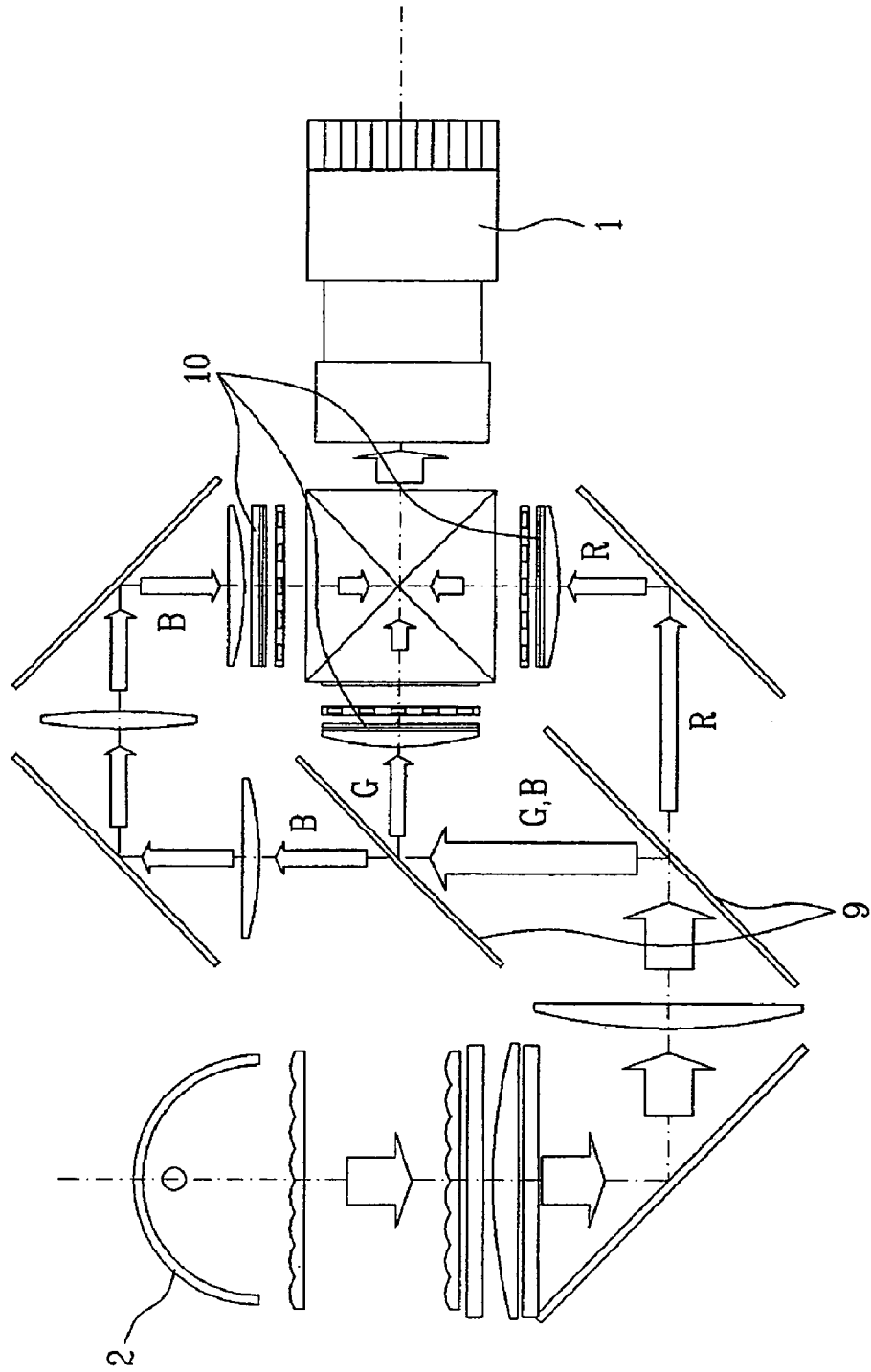
FIG. 2 is a view illustrating an arrangement of a general triple panel type projector.

Reference will now be made in detail to the preferred embodiments of the present invention, examples of which are illustrated in the accompanying drawings. Wherever possible, the same reference numbers will be used throughout the drawings to refer to the same or like parts.

The concept of the present invention is to provide a portable projector wherein a plurality of optical elements are arranged at two facing surfaces of a light transmission member for achieving a stabilized arrangement of the optical elements, and light beams are transmitted through the light transmission member for reducing the length of the path of light.

The optical system of the present invention basically includes a light transmission member, a light source device, and a plurality of optical elements.

Here, the light transmission member may be a glass member, transparent plastic member, or hollow member having an atmosphere or vacuum pressure interior. Of course, it should be understood that other materials may be used to form the light transmission member so long as they have high light transmission efficiency, and the size of the light transmission member may be determined based on the design of the optical system.

When occasion demands, the light transmission member may be fabricated to have a circular, semi-circular, triangular, or polygonal cross section.

In the embodiments of the present invention, the light transmission member is fabricated to have linear and flat surfaces.

In accordance with the design of the optical system, of all surfaces of the light transmission member, certain surface region(s) on which the optical elements are supported, may be fabricated to be raised or dented.

The light source device is designed to emit light beams onto a first surface of the light transmission member, so as to allow the light beams to be transmitted into the member.

Here, the light source device may be one selected from among a laser diode, light emitting diode, and organic electroluminescence element. Preferably, the optical system of the projector includes a laser diode in order to reduce the overall size of the projector.

When occasion demands, the light source device may take the form of an array of light emitting element(s) for irradiating light beams having a single wavelength or light beams having different wavelengths from each other.

In the embodiments of the present invention, the light source device includes a red light source for generating red light beams, a green light source for generating green light beams, and a blue light source for generating blue light beams. The red light source, green light source, and blue light source are placed on the same surface as each other such that they are arranged along the same line parallel to each other.

The light source device may be supported on the first surface of the light transmission member, or may be supported on another member while being spaced apart from the first surface by a predetermined distance.

The light transmission member includes a second surface facing to the first surface, and the optical elements are supported on at least one of the first and second surfaces of the light transmission member. The optical elements are used to diffract the light beams incident from the light source device into the light transmission member and subsequently reproduce and emit an image onto an external screen at the outside of the member.

In the embodiments of the present invention, the first and second surfaces of the light transmission member are arranged to face each other.

Preferably, the optical elements may include one or more elements selected form among a diffraction optical element, a hologram optical element, a plane mirror, a micro-display, and a scan mirror. Preferably, the optical elements may be fabricated in the form of a flat plate, respectively.

The optical elements of the present invention can be fabricated into various forms in accordance with the design of the optical system.

In the optical system of the present invention, the optical elements, which are supported on the first or second surface of the light transmission member, are arranged along the same line parallel to each other.

The optical elements, which are supported on the first surface of the light transmission member, may be positioned alternately with the optical elements which are supported on the second surface of the light transmission member, at a predetermined angle.

The reason of such an alternate arrangement is to minimize the transmission path of light.

To optimize the configuration of the optical system according to the present invention, preferably, the optical elements having drive circuits are arranged on the first surface of the light transmission member, and the optical elements having no drive circuit are arranged on the second surface of the light transmission member.

The reason why the optical elements requiring an arrangement of circuits are gathered on one side is to maximize the utilization of space, thereby achieving a remarkable reduction in the overall size of the optical system.

Meanwhile, the optical system of the present invention may use at least one scan mirror for scanning an image onto an external screen, or may use a micro-display and projection lens for projecting an image onto an external screen.

In the optical system using the scan mirror, if the light source device emits light beams to the optical elements based on an external image signal, and the optical elements diffract and reflect the light beams incident from the light source device, the scan mirror scans the light beams diffracted and reflected from the optical elements based on an external control signal, to reproduce an image onto an external screen located at the outside of the light transmission member.

In the optical system using the micro-display, if the light source device emits light beams to the optical elements, and the optical elements diffract and reflect the light beams incident from the light source device, the micro-display reproduces an image upon receiving the light beams diffracted and reflected from the optical elements, and the projection lens enlarges the image reproduced from the micro-display, so as to emit the enlarged image onto an external screen.

Figure 3A:
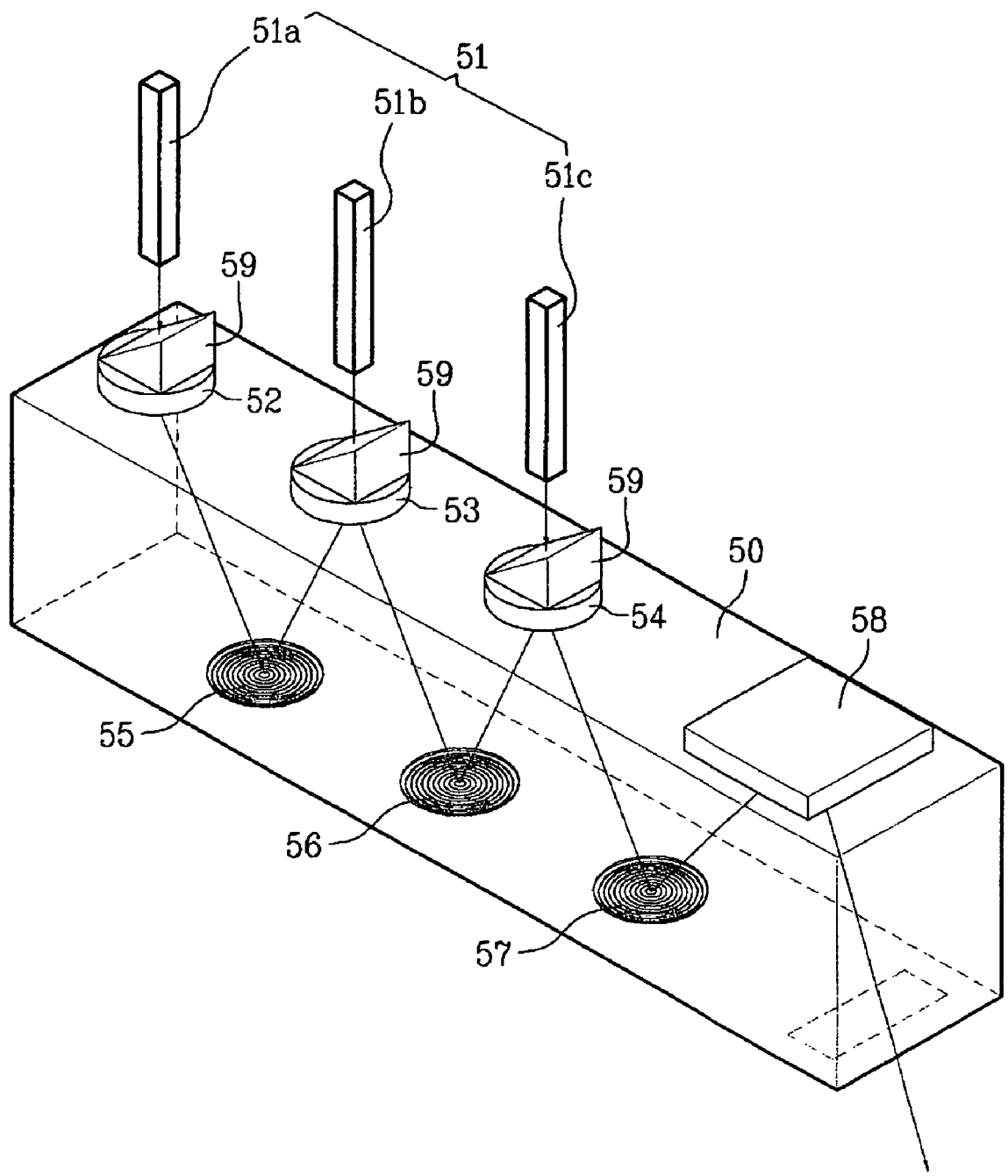
Figure 4A:
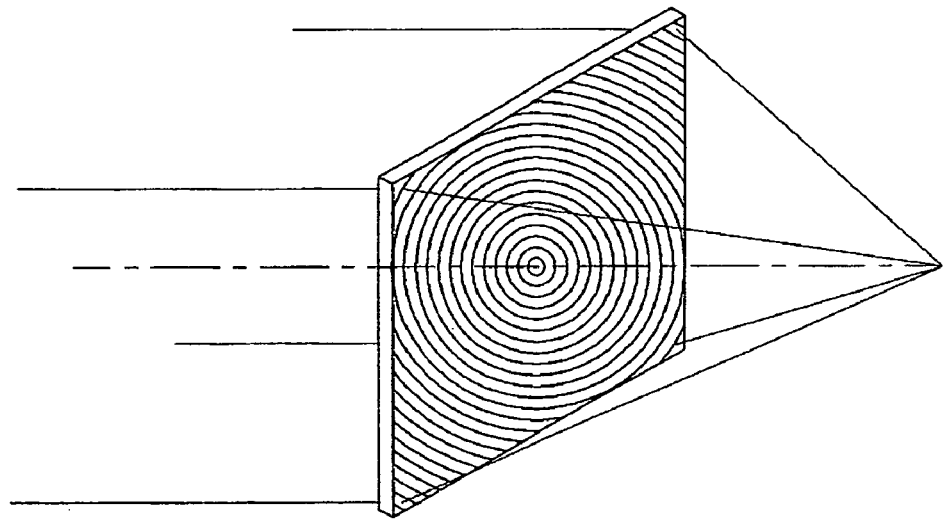
FIGS. 4A to 4E are views illustrating a DOE lens usable in the optical system of a portable projector in accordance with the present invention.
Figure 4B:
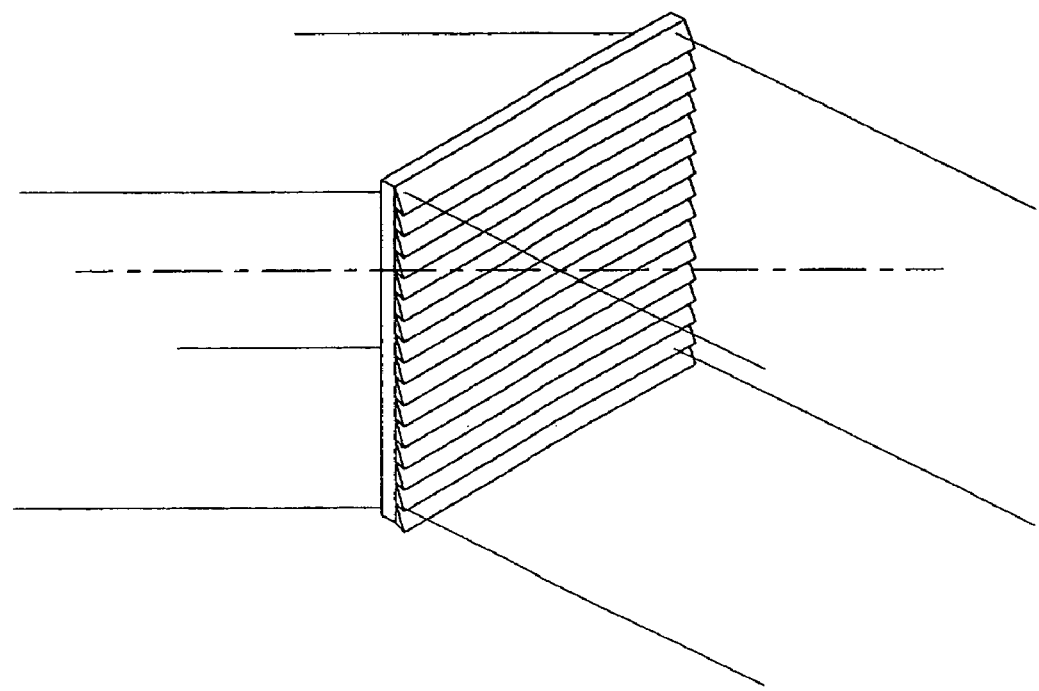
Figure 4C:
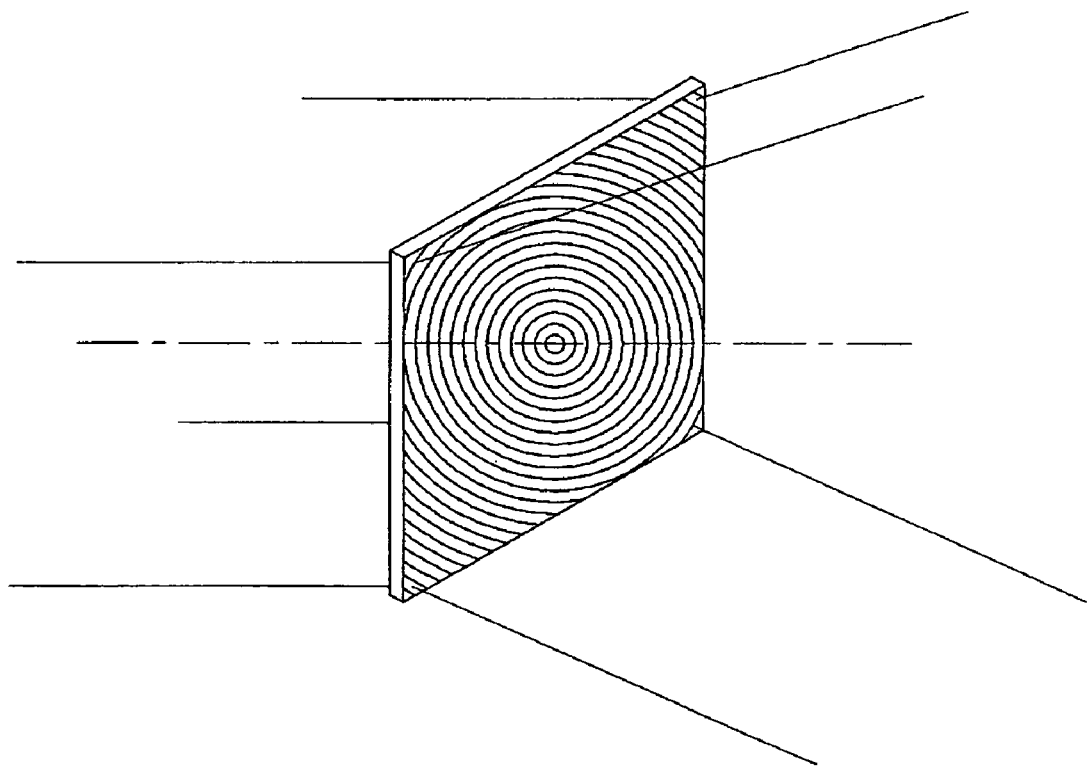
Figure 4D:
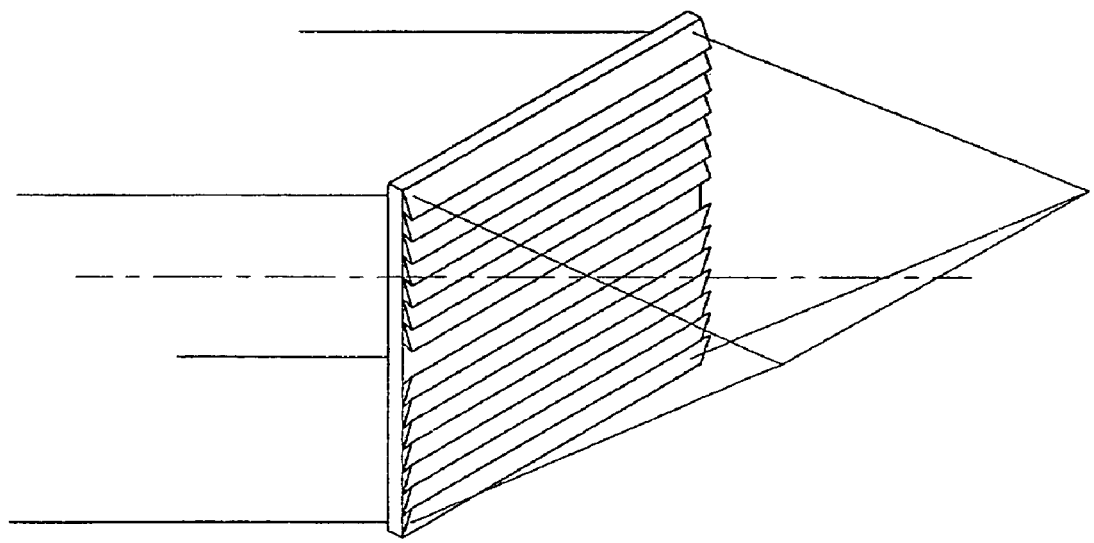
Figure 4E:
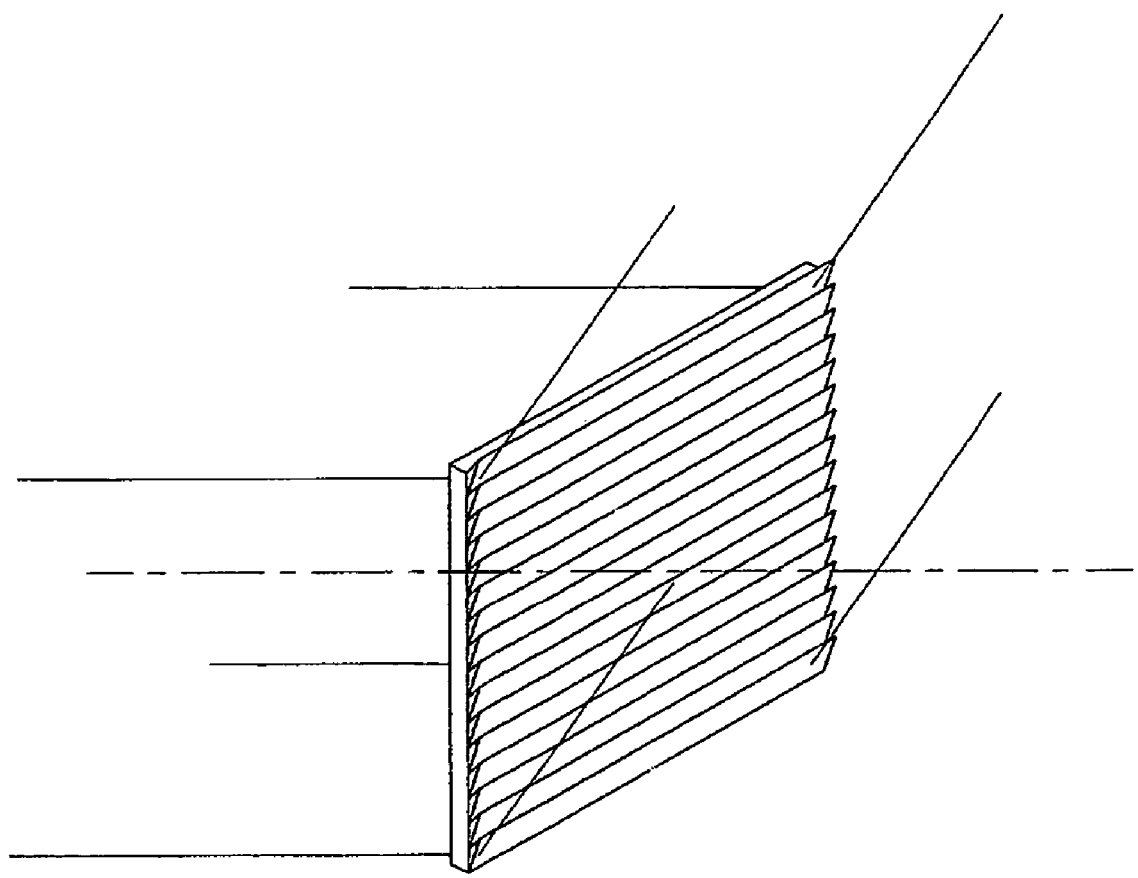

FIGS. 3A and 3B are perspective views illustrating an optical system of a portable projector in accordance with a first embodiment of the present invention.

Specifically, FIG. 3A illustrates an optical system using a scan mirror, and FIG. 3B illustrates an optical system using a micro-display.

As shown in FIG. 3A, the portable projector of the present invention includes a light transmission member 50, a light source device 51, first, second, and third beam splitters 52, 53, and 54, first and second mirrors 55 and 56, a diffraction lens 57, a scan mirror 58, and a plurality of prisms 59.

The light transmission member 50 may be a glass member, transparent plastic member, or hollow member having an atmosphere or vacuum pressure interior. Of course, it should be understood that other materials may be used to form the light transmission member 50 so long as they have high light transmission efficiency, and the size of the light transmission member 50 may be determined based on the design of the optical system.

The light transmission member 50 may have a circular, semi-circular, triangular, or polygonal cross section as occasion demands.

In the embodiment of the present invention, the light transmission member 50 is fabricated to have linear and flat surfaces.

In accordance with the design of the optical system, of all the surfaces of the light transmission member 50, certain surface regions where the first, second, and third beam splitters 52, 53, and 54, first and second mirrors 55 and 56, diffraction lens 57, and scan mirror 58 are supported may be fabricated to be raised or dented.

The light source device 51 is designed to emit light beams onto a first surface of the light transmission member 50 based on an external image signal, so as to allow the light beams to be transmitted into the light transmission member 50.

The light source device 51 includes a red laser light source 51a, a green laser light source 51b, and a blue laser light source 51c. The light source device 51 may be supported on the first surface of the light transmission member 50, or may be supported on another member while being spaced apart from the first surface by a predetermined distance.

The prisms 59 are placed on the first, second, and third beam splitters 52, 53, and 54, respectively. The prisms 59 serve to change the direction of light beams are incident from the light source device 51.

When occasion demands, the prisms may be omitted if the beam splitters are substituted by light splitters having a grating angle for changing the path of light beams incident from the light source device.

Here, the grating angle is formed at a surface of each light splitter facing the light source device 51.

The first beam splitter 52, to which the prism 59 is attached, is supported on the first surface of the member 50, and is used to diffract light beams incident from the red laser light source 51a, to emit the diffracted light beams onto a second surface of the member 50.

The first beam splitter 52 is able to transmit a red wavelength while performing total reflection of green and blue wavelengths.

The second beam splitter 53, to which the prism 59 is attached, is supported on the first surface of the member 50, and is used to diffract not only light beams incident from the green laser light source 51b, but also light beams reflected from the first mirror 55, to emit the diffracted light beams onto the second surface of the light transmission member 50.

The second beam splitter 53 is able to transmit a green wavelength while performing total reflection of red and blue wavelengths.

The third beam splitter 54, to which the prism 59 is attached, is supported on the first surface of the light transmission member 50, and is used to diffract not only light beams incident from the blue laser light source 51c, but also light beams, reflected from the second mirror 56, to emit the diffracted light beams onto the second surface of the member 50.

The third beam splitter 54 is able to transmit a blue wavelength while performing total reflection of red and green wavelengths.

The first mirror 55 is supported on the second surface of the member 50, and is used to reflect the light beams diffracted from the first beam splitter 52.

The second mirror 56 is supported on the second surface of the member 50, and is used to reflect the light beams diffracted from the second beam splitter 53.

The diffraction lens 57 is supported on the second surface of the member 50, and is used to diffract the light beams diffracted from the third beam splitter 54.

Here, the diffraction lens 57 may be a circular diffraction optical element.

The scan mirror 58 is supported on the first surface of the member 50, and is used to scan the light beams diffracted from the diffraction lens 57 based on an external control signal.

Preferably, the first and second surfaces of the light transmission member 50 are arranged to face each other. Preferably, the first, second, and third beam splitters 52, 53, and 54, first and second mirrors 55 and 56, diffraction lens 57, and scan mirror 58 are fabricated in the form of a flat plate, respectively.

Furthermore, the first, second, and third beam splitters 52, 53, and 54, and scan mirror 58 are supported on the first surface of the light transmission member 50 while being arranged along the same line parallel to each other. The first and second mirrors 55 and 56, and diffraction lens 57 are supported on the second surface of the light transmission member 50 while being arranged along the same line parallel to each other.

The first, second, and third beam splitters 52, 53, and 54, and scan mirror 58, which are supported on the first surface of the light transmission member 50, may be positioned alternately with the first and second mirrors 55 and 56, and diffraction lens 57, which are supported on the second surface of the light transmission member 50, at a predetermined angle.

The reason of such an alternate arrangement is to minimize the transmission path of light.

To optimize the arrangement of the optical system according to the present invention, it is desirable that optical elements having drive circuits be arranged on the first surface of the light transmission member 50, whereas optical elements having no drive circuit be arranged on the second surface of the light transmission member 50.

The reason why the optical elements requiring an arrangement of circuits are gathered on one side is to maximize the utilization of space, thereby achieving a remarkable reduction in the size of the optical system.

Now, the operation method of the portable projector in accordance with the present invention having the above described configuration will be explained.

As shown in FIG. 3A, first, the light source device 51, including the red laser light source 51a, green laser light source 51b, and blue laser light source 51c, emits light beams onto the first surface of the light transmission member 50 based on an external image signal.

The light beams, emitted from the red laser light source 51a, are incident on the first beam splitter 52, which is supported on the first surface of the light transmission member 50 while being attached to the prism 59.

Subsequently, the first beam splitter 52 diffracts the incident light beams, to emit the diffracted light beams to the first mirror 55 that is placed on the second surface of the light transmission member 50.

Then, the first mirror 55 reflects the light beams, diffracted from the first beam splitter 52, to the second beam splitter 53 that is placed on the first surface of the light transmission member 50.

Meanwhile, the light beams, emitted from the green laser light source 51b, are incident on the second beam splitter 53, which is supported on the first surface of the light transmission member 50 while being attached to the prism 59.

The second beam splitter 53 is designed to transmit a green wavelength while performing total reflection of a red wavelength. Therefore, the second beam splitter 53 diffracts not only the green light beams incident from the green laser light source 51b, but also the red light beams reflected from the first mirror 55, to emit the diffracted light beams to the second mirror 56 that is placed on the second surface of the light transmission member 50.

Then, the second mirror 56 reflects the light beams, diffracted from the second beam splitter 53, to the third beam splitter 54 that is placed on the first surface of the light transmission member 50.

Meanwhile, the light beams, emitted from the blue laser light source 51c, are incident on the third beam splitter 54, which is supported on the first surface of the light transmission member 50 while being attached to the prism 59.

The third beam splitter 54 is designed to transmit a blue wavelength while performing total reflection of red and green wavelengths. Therefore, the third beam splitter 54 diffracts not only the blue light beams incident from the blue laser light source 51c, but also the red and green light beams reflected from the second mirror 56, to emit the diffracted light beams to the diffraction lens 57 that is placed on the second surface of the light transmission member 50.

Thereafter, the red, green, and blue light beams diffracted from the diffraction lens 57 are incident on the scan mirror 58 that is placed on the first surface of the member 50. Thereby, the scan mirror 58 scans and emits the incident light beams onto an external screen.

Here, the scan mirror 58 may include an one-dimensional scan mirrors scanning incident light beams horizontally and an one-dimensional scan mirror scanning incident light beams vertically, or may be a two-dimensional scan mirror scanning incident light beams vertically and horizontally.

In the present invention, a galvano mirror is usable as the scan mirror 58.

FIG. 3B illustrates an optical system using a micro-display instead of the scan mirror.

A micro-display 60 is used to reproduce an image upon receiving the light beams diffracted from the diffraction lens 57. In this case, a projection lens 61 is provided to enlarge the image reproduced from the micro-display 60, so as to emit the enlarged image onto an external screen.

FIGS. 4A to 4E are views illustrating a DOE lens that is usable in the optical system of the portable projector in accordance with the present invention. In accordance with the design of the optical system, a variety of DOE lenses are usable.

FIG. 5 is a perspective view illustrating an optical system of a portable projector in accordance with a second embodiment of the present invention.

As shown in FIG. 5, the projector of the present invention includes the light transmission member 50, light source device 51, first, second, and third lenses 72, 73, and 74, first, second, and third mirrors 75, 76, and 77, a diffraction lens 78, and a scan mirror 79.

The first lens 72 may be a diffraction optical element (DOE) type lens. In accordance with the design of the optical system, a variety of DOE lenses are usable.

The first lens 72 is fabricated such that an upper surface thereof, onto which laser light beams are incident, has a different grating state from that of a lower surface thereof from which the laser light beams are emitted.

Figure 6A:
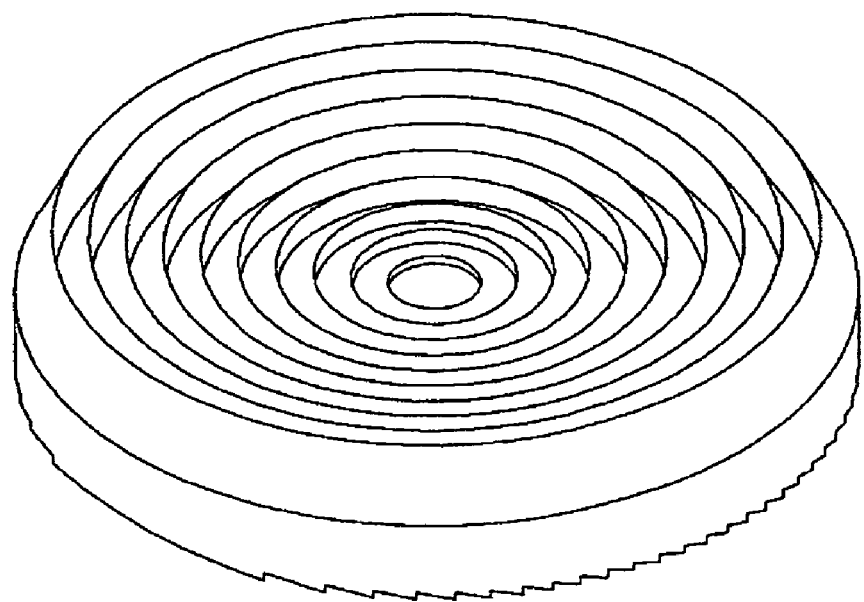
FIGS. 6A and 6B are views illustrating a grating that is formed at a surface of a lens of FIG. 5.
Figure 6B:
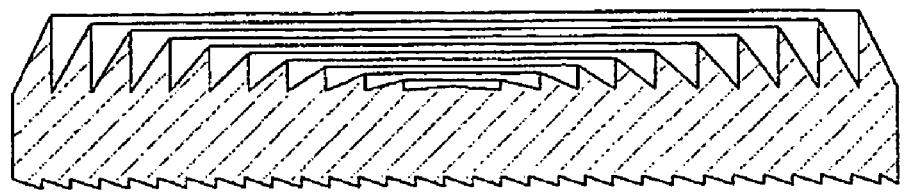

As shown in FIGS. 6A and 6B, the laser light beam incident surface of the first lens 72 has a grating angle for converging the laser light beams, whereas the laser light beam emitting surface of the first lens 72 has a grating angle for changing the path of laser light beams.

Such a grating structure of the lens may be changed in various manners in accordance with the design of the optical system.

The second lens 73 is supported on the first surface of the member 50, and is used to diffract not only light beams incident from the green laser light source 51b, but also light beams reflected from the first mirror 75, to emit the diffracted light beams onto the second surface of the member 50.

Although the second lens 73 has the same grating structure as that of the first lens 72, it has a difference in that a beam splitter (not shown) is provided at a surface of the second lens 73 onto which the light beams reflected from the first mirror 75 are incident, the beam splitter being adapted to transmit a green wavelength while performing total reflection of a red wavelength.

The third lens 74 is supported on the first surface of the light transmission member 50, and is used to diffract not only light beams incident from the blue laser light source 51c, but also light beams reflected from the second mirror 76, to emit the diffracted light beams onto the second surface of the member 50.

Although the third lens 74 has the same grating structure as that of the first lens 72, it has a difference in that a beam splitter (not shown) is provided a surface of the third lens 74 onto which the light beams reflected from the second mirror 76 are incident, the beam splitter being adapted to transmit a blue wavelength while performing total reflection of red and green wavelengths.

The first mirror 75 is supported on the second surface of the member 50, and is used to reflect the light beams diffracted from the first lens 72.

The second mirror 76 is supported on the second surface of the member 50, and is used to reflect the light beams diffracted from the second lens 73.

The third mirror 77 is supported on the second surface of the member 50, and is used to reflect the light beams diffracted from the third lens 74.

The diffraction lens 78 is supported on the first surface of the member 50, and is used to diffract the light beams reflected from the third mirror 77.

The diffraction lens 78 may use a circular diffraction optical element.

The scan mirror 79 is supported on the second surface of the member 50, and is used to scan the light beams diffracted from the diffraction lens 78 based on an external control signal.

Here, the scan mirror 79 may use a galvano mirror scanning incident light beams in a two dimensional manner.

Alternatively, the scan mirror 79 may be substituted by two scan mirrors.

In the alternative embodiment, the two scan mirrors include a galvano mirror scanning incident light beams horizontally, and a galvano mirror scanning incident light beams vertically.

Although not shown, in the same manner as the above described first embodiment of the present invention, the optical system according to the second embodiment of the present invention may be fabricated to use a micro-display instead of the scan mirror.

Figure 7:
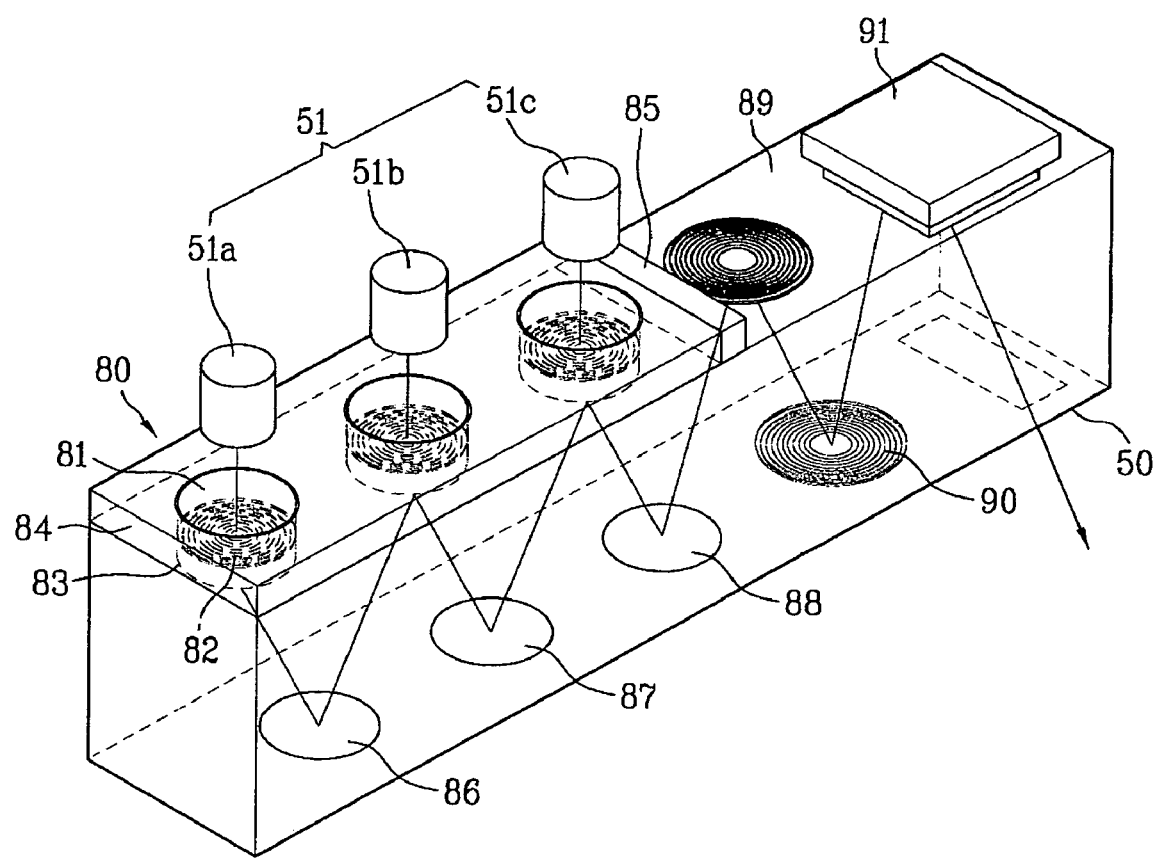
FIG. 7 is a perspective view illustrating an optical system of a portable projector in accordance with a third embodiment of the present invention.

FIG. 7 is a perspective view illustrating an optical system of a portable projector in accordance with a third embodiment of the present invention.

As shown in FIG. 7, in the third embodiment of the present invention, a speckle noise remover 80 is provided to remove noise of laser light beams.

The speckle noise remover 80 is placed on the first surface of the member 50.

The speckle noise removers 80 includes at least one light splitter 83, a lens 82 placed on the light splitter 83, and a plate 81 placed on the lens 82, the light splitter 83, lens 82, and plate 81 being integrally formed with one another.

The light splitter 83 is placed on the first surface of the member 50, and is used to transmit a specific wavelength of light beams emitted from the light source device 51.

The lens 82 is placed on a surface of the light splitter 83 facing the light source device 51, and is used to diffract the light beams emitted from the light source device 51.

Here, the lens 82 may be a DOE lens having a grating angle as shown in FIGS. 6A and 6B.

The plate 81 is placed on a surface of the lens 82 facing the light source device 51, and has an irregular surface pattern for removing speckle noise of the light beams emitted from the light source device 51.

In the present invention, preferably, a random phase plate (RPP) is usable as the plate 81.

Figure 8:
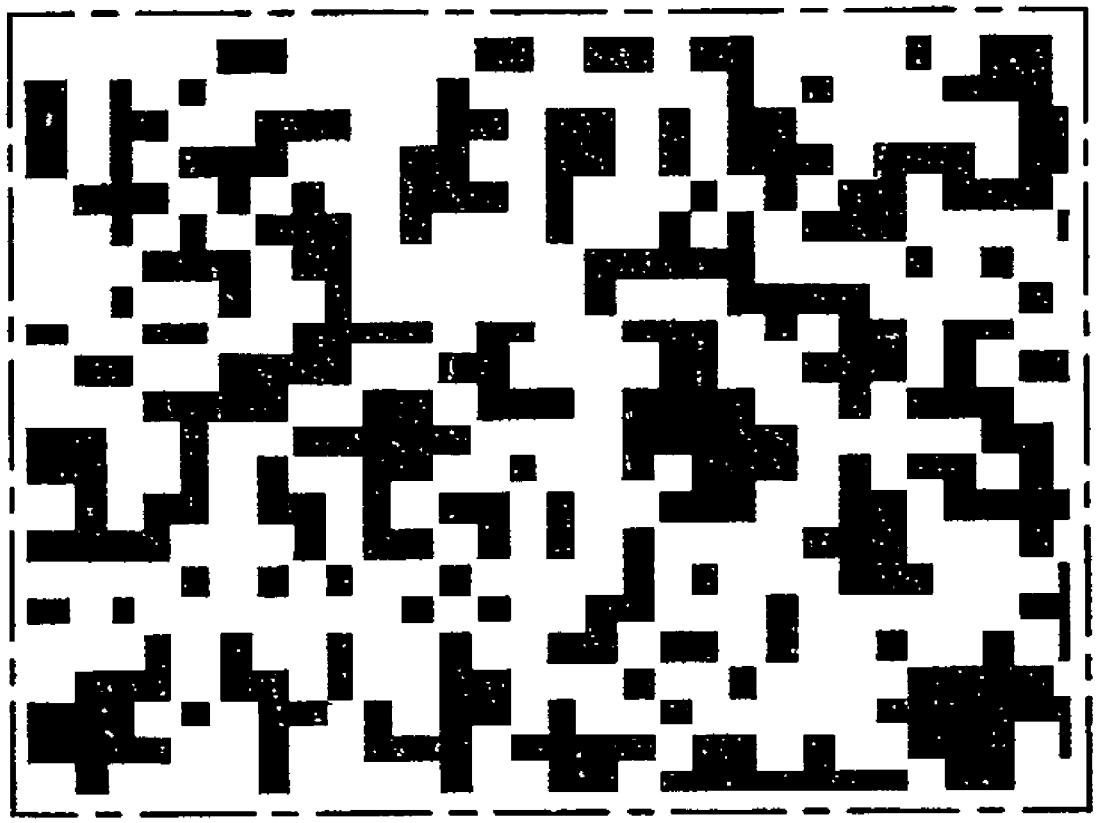
FIG. 8 is a view illustrating a hologram pattern that is generated at a plate of FIG. 7.

As shown in FIG. 8, it is desirable that the pattern of the plate 81 be a hologram pattern that is produced by a computer. Such a pattern varies the phase of laser light beams by $\pi$.

The area of the plate 81 is preferably larger than that of the light splitter 83 or the lens 82.

A drive 85 is provided to simultaneously reciprocate the light splitter 83, lens 82, and plate 81 in one direction.

Here, the drive 85 is configured to induce fine vibrations of the plate 81 of the speckle noise remover 80 for removing speckle noise of the light beams.

Although any other means capable of causing vibrations having a short displacement are usable as the drive 85, it is preferable to use an electromagnetic element vibrating by an electric field, or a piezoelectric element vibrating while being expanded or constricted by a piezoelectric phenomenon.

Now, the path of light beams in accordance with the third element of the present invention having the above described configuration will be explained.

As shown in FIG. 7, the laser light beams, emitted from the light source device 51, are incident on the first surface of the member 50 such that they pass through the speckle noise remover 80. Thereby, the light beams, from which speckle noise is removed, are reflected by mirrors 86, 87 and 88 that are placed on the second surface of the member 50.

Subsequently, the reflected light beams are emitted onto an external screen after passing through DOE lenses 89 and 90 and a scan mirror 91.

Here, the scan mirror 91 may be a galvano mirror scanning incident light beams in a two dimensional manner.

When occasion demands, the scan mirror 91 may be substituted by two scan mirrors.

Although not shown, in the same manner as the above described first embodiment of the present invention, the optical system in accordance with the third embodiment of the present invention may be fabricated to use a micro-display instead of the scan mirror.

Figure 9:
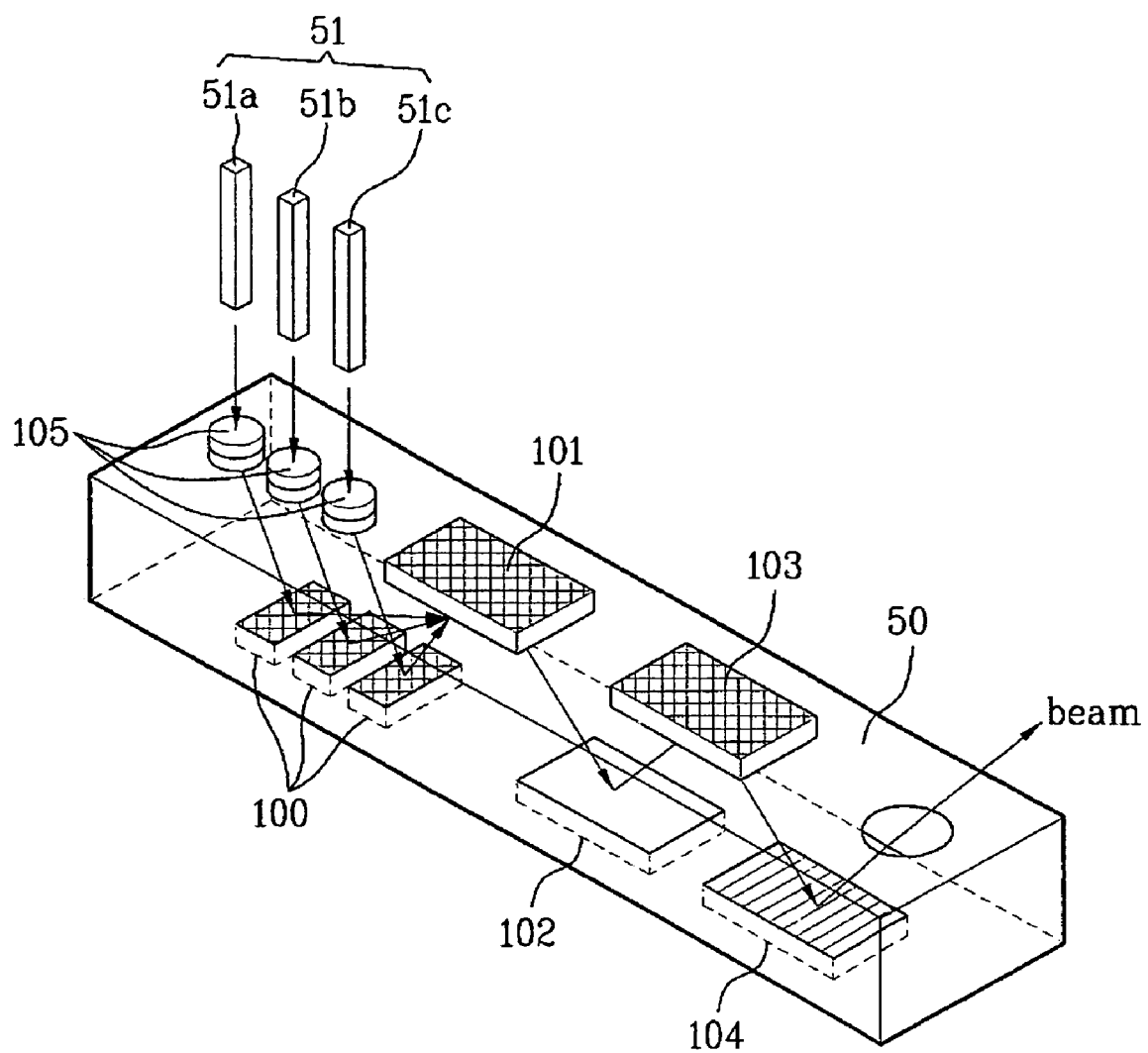
FIG. 9 is a perspective view illustrating an optical system of a portable projector in accordance with a fourth embodiment of the present invention.

FIG. 9 is a perspective view illustrating an optical system of a portable projector in accordance with a fourth embodiment of the present invention.

As shown in FIG. 9, the optical system in accordance with the fourth embodiment of the present invention includes the light source device 51, a plurality of DOE lenses 100, 101, and 105, a color filter 102, and first and second scan mirrors 103 and 104.

The laser light beams, emitted from the light source device 51, are diffracted by the DOE lenses 105. The diffracted light beams are then again diffracted by the DOE lenses 100 that are located on the second surface of the member 50.

Subsequently, the diffracted light beams are composed by the DOE lens 101, and the composed light beam is then separated by the color filter 102 that is placed on the second surface of the member 50.

The separated light beams are emitted onto an external screen after passing through the first and second scan mirrors 103 and 104.

Here, the first scan mirror 103 may be a galvano mirror scanning incident light beams horizontally, and the second scan mirror 104 may be a galvano mirror scanning incident light beams vertically.

When occasion demands, the two scan mirrors may be substituted by a single galvano mirror scanning incident light beams in a two dimensional manner.

Although not shown, in the same manner as the above described first embodiment of the present invention, the optical system according to the fourth embodiment of the present invention may be fabricated to use a micro-display instead of the scan mirror.

The optical system of the portable projector in accordance with the present invention having the above described operation method is able to achieve not only a stabilized arrangement of the optical elements, but also a reduction in the length of the path of light because light beams are transmitted through the light transmission member. Accordingly, the optical system of the present invention can achieve a reduction in the size and weight, and thus, is suitable for a portable projector.

Figure 10:
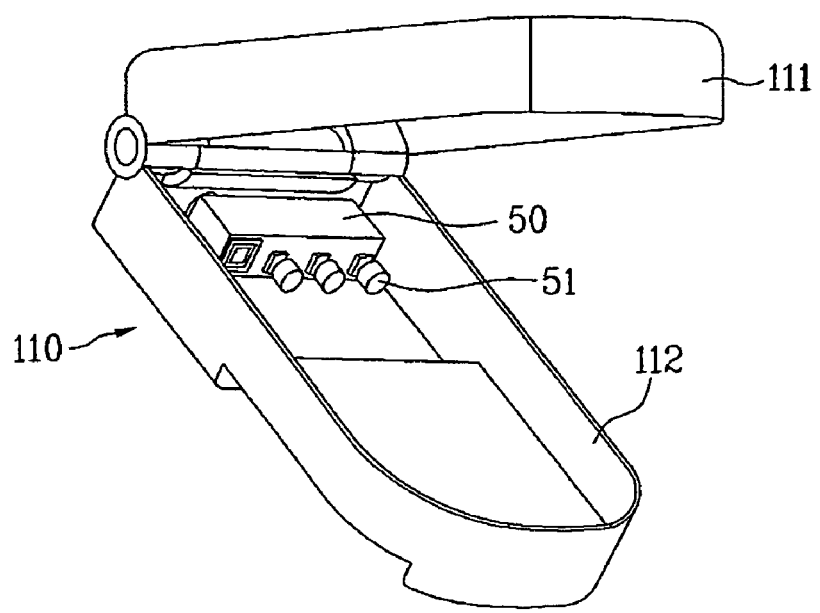
FIGS. 10 to 18 are schematic views illustrating a mobile laser projector phone using the optical system of the portable projector in accordance with the present invention.
Figure 11:
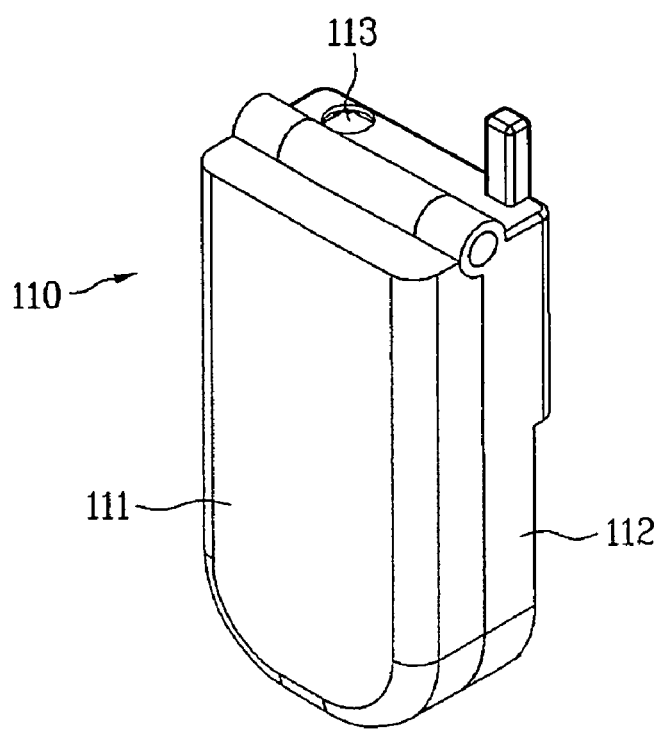

FIGS. 10 and 11 are schematic views illustrating a mobile laser projector phone using the optical system for the portable projector in accordance with the present invention. As shown in FIGS. 10 and 11, the optical system of the present invention is conveniently applicable to an appliance having a small internal space such as the mobile phone.

The mobile phone 110 includes a body 112 and a cover 111.

The body 112 is provided with a plurality of keypads and a hole 113. The cover 111 is provided with a display panel, and is connected to the body 112.

The light transmission member 50 is mounted in the body 112 at a side surface of the body 112 through which the hole 113 is perforated. Thereby, the light transmission member 50 is able to emit light beams reproducing an image to the outside of the body 112 through the hole 113.

The light source device 51 is mounted in the body 112, and is adapted to emit light beams onto the optical elements that are attached to certain surface(s) of the light transmission member 50.

Figure 12:
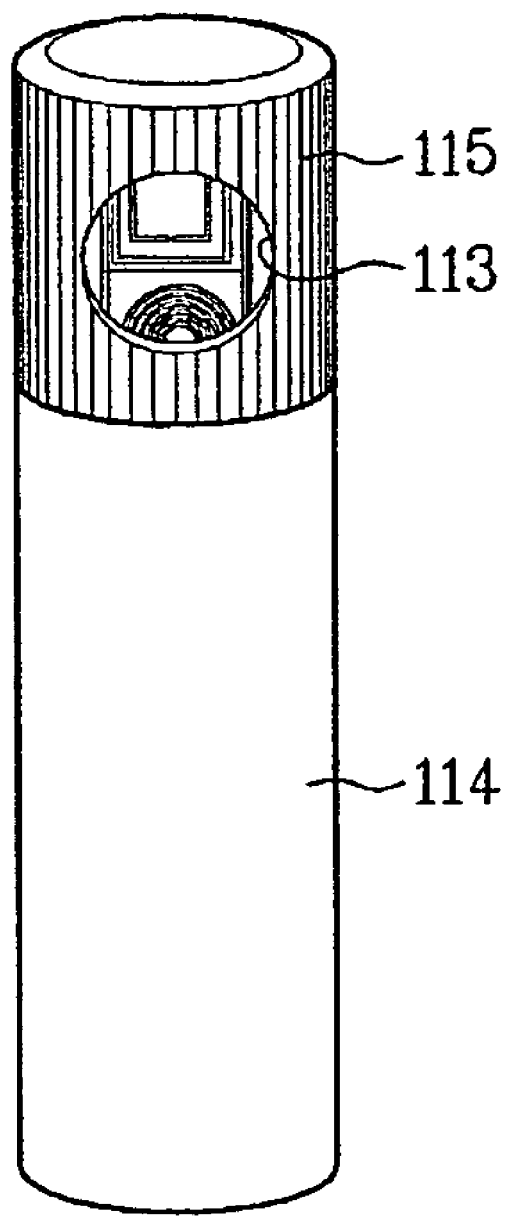
Figure 13:
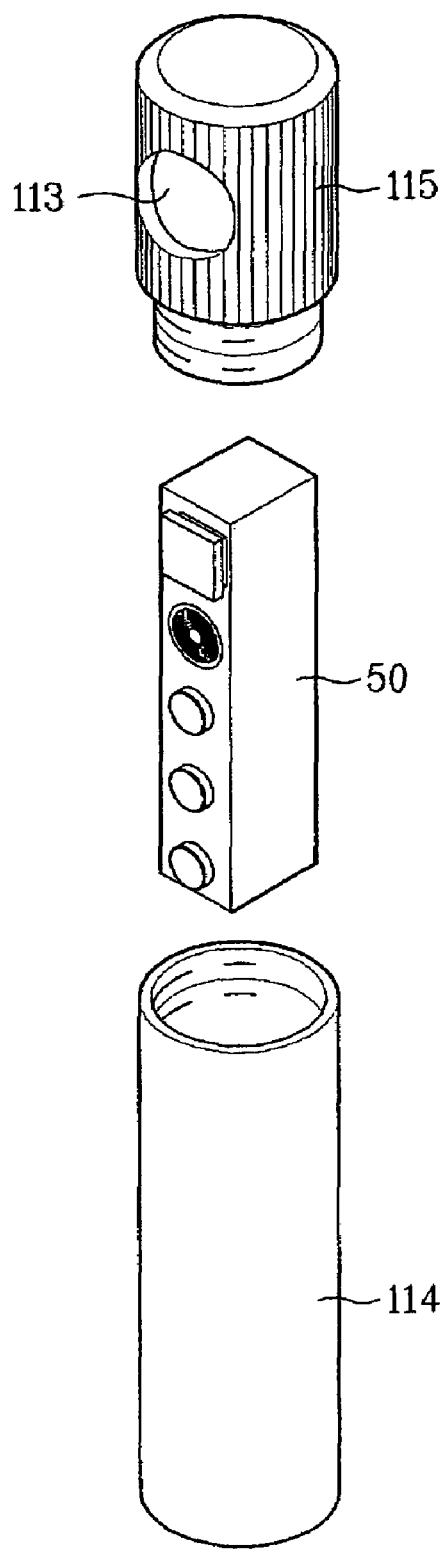

As shown in FIGS. 12 and 13, alternatively, the light transmission member 50, to which the optical elements are attached, and the light source device 51 may be protected by a housing 114.

In this case, the hole 113 may be perforated through a peripheral location of the housing 114, such that the light beams reproducing an image can be emitted from the light transmission member 50 to the outside of the housing 114.

A plurality of knurls 115 may be formed at an outer peripheral surface of the housing 114 around the hole 113.

The knurls 115 serve as means for preventing slippage of fingers when a user turns the housing 114, in order to regulate the projecting direction of the projector.

Figure 14:
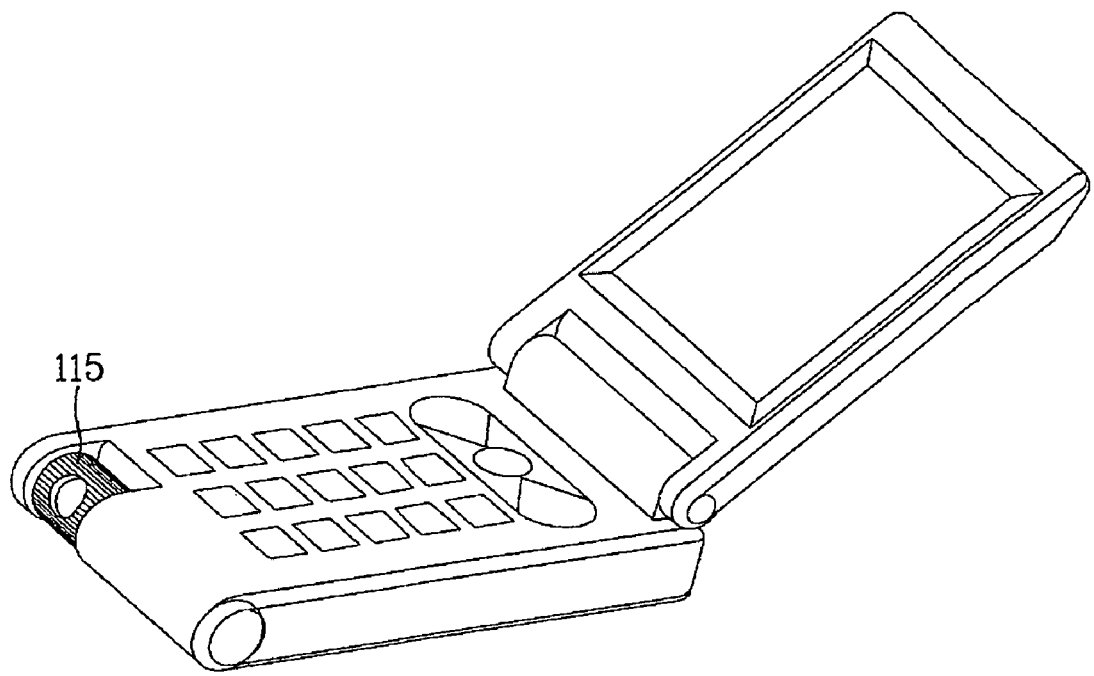
Figure 15:
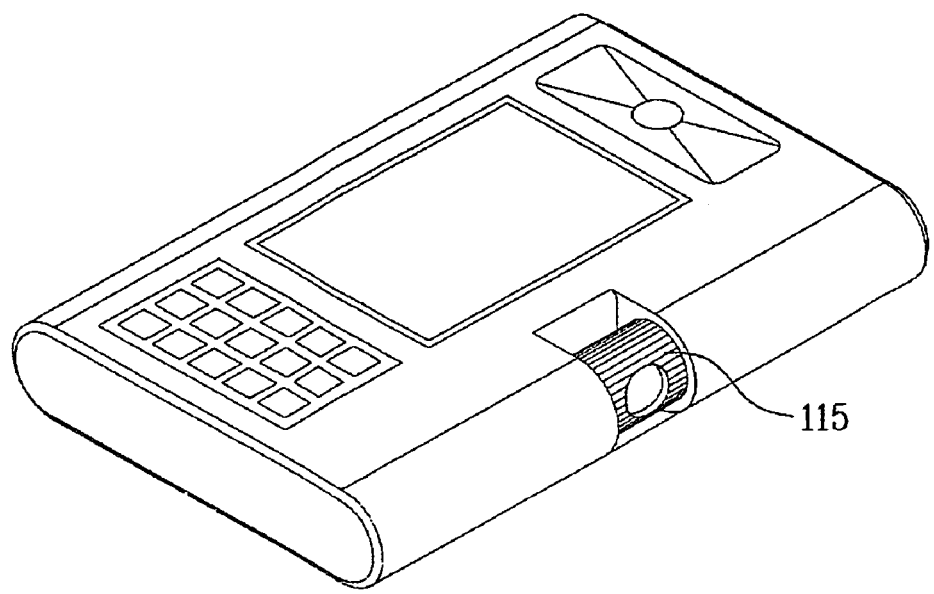

FIGS. 14 and 15 are views illustrating various examples of mobile phones using the projector that is received in the housing as shown in FIG. 12.

Figure 16:
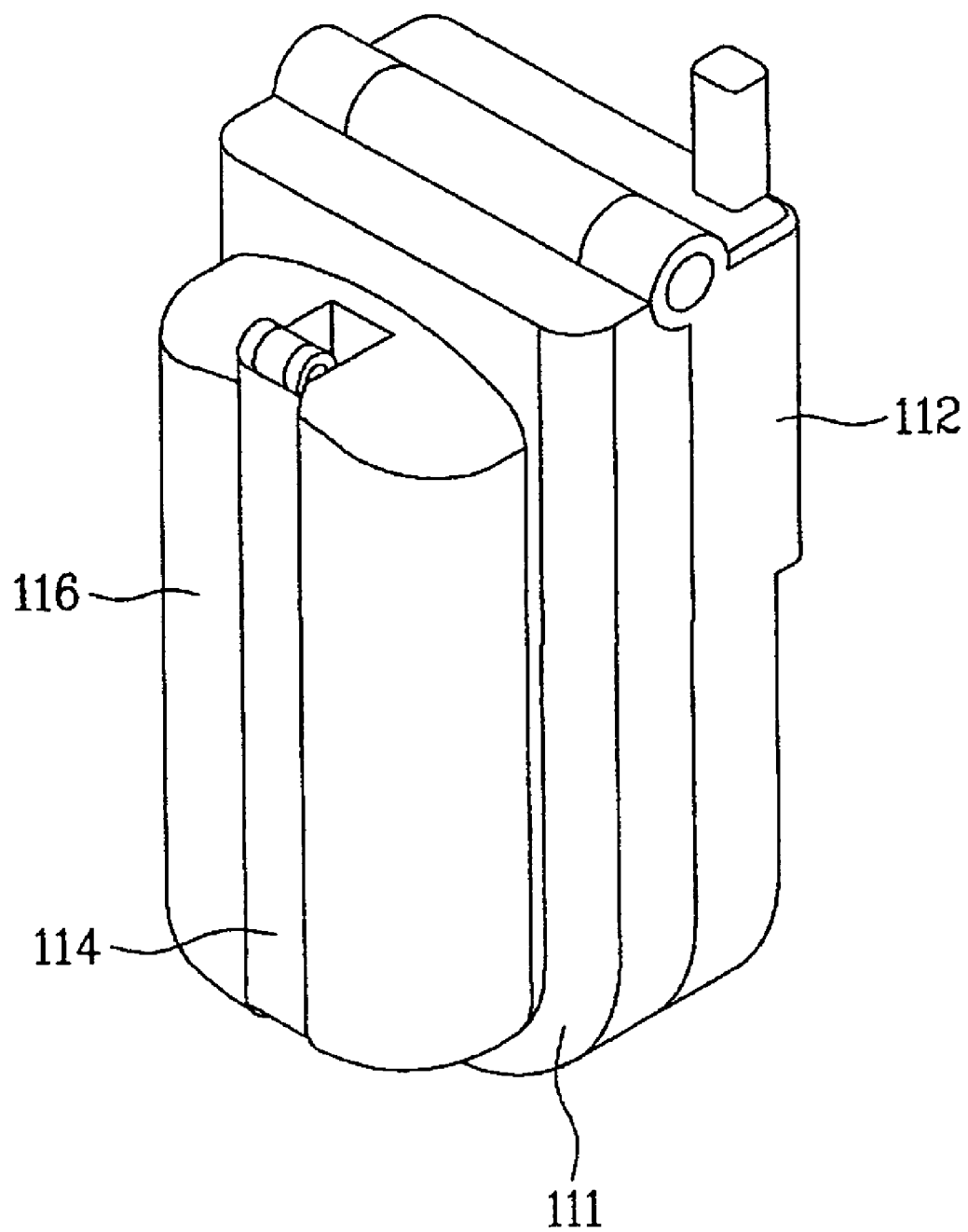
Figure 17:
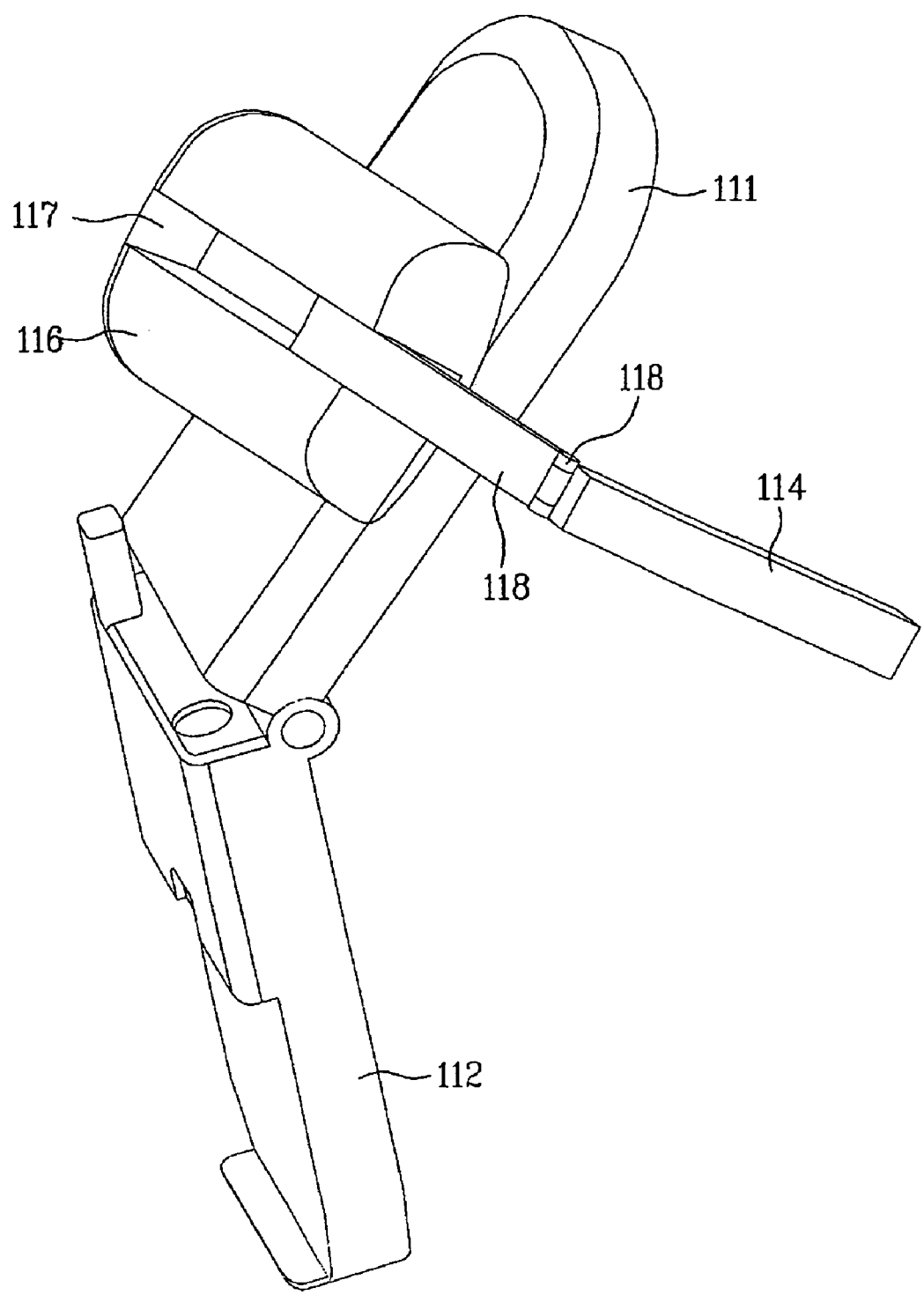
Figure 18:
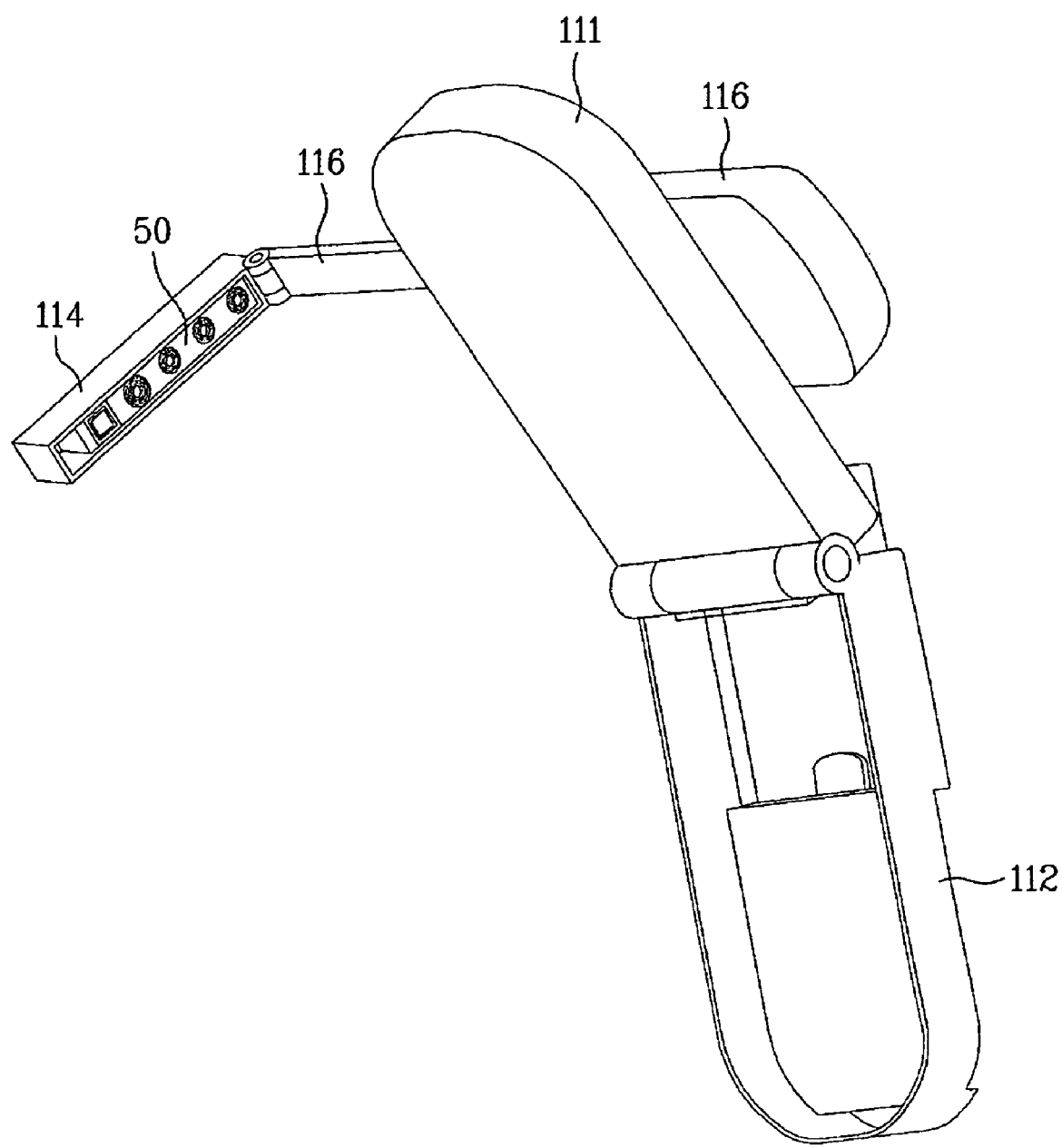

FIGS. 16, 17, and 18 illustrate yet another example of the projector that is mounted in the cover of the mobile phone.

As shown in FIGS. 16, 17, and 18, the body 112 of the mobile phone, which is provided with a plurality of keypads, is connected to the cover 111 which is provided with a display panel.

A supporting member 116 is rotatably mounted on the cover 111. The supporting member 116 is formed with a groove 117 along a longitudinal direction thereof.

A connecting piece 118 is received in the groove 117 to slide along the groove 117. The housing 114, which has a hole at a side location thereof, is connected to one end of the connecting piece 118.

In this case, the light transmission member 50 is mounted in the housing 114 such that the light beams reproducing an image can be emitted from the light transmission member 50 to the outside of the housing 114 through the hole.

The housing 114 also receives a light source device to emit light beams onto optical elements that are attached to a surface of the light transmission member 50.

As apparent from the above description, in an optical system of a portable projector and a mobile transmission terminal using the same in accordance with the present invention, a plurality of optical elements are arranged at two facing surfaces of a light transmission member, whereby an arrangement of the optical elements can be stabilized. Furthermore, the present invention allows light beams to be transmitted through the light transmission member. This has the effect of reducing the length of the path of light.

Accordingly, the present invention can achieve a reduction in size and weight of the projector. Therefore, the present invention is applicable to all kinds of portable appliances such as mobile phones, and enables a variety of designs as occasion demands, resulting in a wide application range.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical system of a portable projector comprising:
   a light transmission member having first and second surfaces;
   a light source device for emitting light beams onto the first surface of the light transmission member based on an external image signal, so as to allow the light beams to be transmitted into the light transmission member;
   one or more optical elements supported on at least one of the first and second surfaces of the light transmission member for diffracting and reflecting the light beams incident from the light source device into the light transmission member and
   at least one scan mirror supported on one of the first and second surfaces of the light transmission member for scanning the light beams, diffracted and reflected from the optical elements, onto an external screen at the outside of the light transmission member, based on an external control signal, wherein the optical elements include:
   at least one light splitter supported on the first surface of the light transmission member for transmitting a specific wavelength of the light beams emitted from the light source device;
   a first lens placed on a surface of the light splitter facing the light source device for diffracting the light beams emitted from the light source device; and
   at least one second lens supported on at least one of the first and second surfaces of the light transmission member for diffracting the light beams emitted from the light splitter, to emit the diffracted light beams to the scan mirror, wherein a first surface of the first lens, on which the light beams are incident, has a grating angle for converging the light beams, and a second surface of the first lens, from which the light beams are emitted, has a grating angle for changing the path of the light beams.

2. The optical system as set forth in claim 1, wherein the light transmission member is a glass member, transparent plastic member, or hollow member having an atmosphere or vacuum pressure interior.

3. The optical system as set forth in claim 1, wherein the light transmission member has a circular, semi-circular, triangular, or polygonal cross section.

4. The optical system as set forth in claim 1, wherein the light transmission member has linear and flat surfaces.

5. The optical system as set forth in claim 1, wherein, of all surfaces of the light transmission member, the at least one surface on which the optical elements are supported is raised or dented.

6. The optical system as set forth in claim 1, wherein the first and second surfaces of the light transmission member face each other.

7. The optical system as set forth in claim 1, wherein the light source device is any one selected from among a laser diode, light emitting diode, and organic electroluminescence element.

8. The optical system as set forth in claim 1, wherein the light source device is a light emitting element or light emitting element array for emitting light beams having a single wavelength or light beams having different wavelengths from each other.

9. The optical system as set forth in claim 1, wherein the light source device is supported on the first surface of the light transmission member, or is spaced apart from the first surface by a predetermined distance.

10. The optical system as set forth in claim 1, wherein the light source device includes a red light source generating red light beams, a green light source generating green light beams, and a blue light source generating blue light beams.

11. The optical system as set forth in claim 10, wherein the red light source, green light source, and blue light source are arranged along the same line parallel to each other.

12. The optical system as set forth in claim 1, wherein the optical elements include one or more elements selected form among a diffraction optical element, hologram optical element, plane mirror, micro-display, and scan mirror.

13. The optical system as set forth in claim 1, wherein each of the optical elements takes the form of a flat plate.

14. The optical system as set forth in claim 1, wherein the optical elements, which are supported on the same surface of the light transmission member as each other, are arranged along the same line parallel to each other.

15. The optical system as set forth in claim 1, wherein the optical elements, which are supported on the first surface of the light transmission member, are positioned alternately with the optical elements which are supported on the second surface of the light transmission member, at a predetermined angle.

16. The optical system as set forth in claim 1, wherein the optical elements having drive circuits are arranged on one of the first and second surfaces of the light transmission member, and the optical elements having no drive circuit are arranged on the other surface.

17. An optical system of a portable projector comprising:
a light transmission member having first and second surfaces;
a light source device for emitting light beams onto the first surface of the light transmission member based on an external image signal, so as to allow the light beams to be transmitted into the light transmission member;
one or more optical elements supported on at least one of the first and second surfaces of the light transmission member for diffracting and reflecting the light beams incident from the light source device into the light transmission member; and
at least one scan mirror supported on one of the first and second surfaces of the light transmission member for scanning the light beams, diffracted and reflected from the optical elements, onto an external screen at the outside of the light transmission member, based on an external control signal, wherein the optical elements include:
at least one light splitter supported on the first surface of the light transmission member for transmitting a specific wavelength of the light beams emitted from the light source device;
a first lens placed on a surface of the light splitter facing the light source device for diffracting the light beams emitted from the light source device;
a plate placed on a surface of the first lens facing the light source device, and having an irregular surface pattern for removing speckle noise of the light beams emitted from the light source device; and
at least one second lens supported on at least one of the first and second surfaces of the light transmission member for diffracting the light beams emitted from the light splitter, to emit the diffracted light beams to the scan mirror.

18. The optical system as set forth in claim 17, wherein the light splitter, first lens, and plate are integrally formed with one another.

19. The optical system as set forth in claim 17, further comprising:
a drive to simultaneously reciprocate the light splitter, first lens, and plate in one direction.

20. The optical system as set forth in claim 19, wherein the drive is an electromagnetic element or piezoelectric element.

21. The optical system as set forth in claim 17, wherein the plate has an area larger than that of the light splitter or the first lens.

22. An optical system of a portable projector comprising:
a light transmission member having first and second surfaces;
a light source device for emitting light beams onto the first surface of the light transmission member based on an external image signal, so as to allow the light beams to be transmitted into the light transmission member;
one or more optical elements supported on at least one of the first and second surfaces of the light transmission member for diffracting and reflecting the light beams incident from the light source device into the light transmission member; and
at least one scan minor supported on one of the first and second surfaces of the light transmission member for scanning the light beams, diffracted and reflected from the optical elements, onto an external screen at the outside of the light transmission member, based on an external control signal, wherein the optical elements include:
at least one first lens supported on the first surface of the light transmission member for diffracting the light beams emitted from the light source device;
a second lens supported on the second surface of the light transmission member for composing the light beams diffracted from the first lens;
a color filter supported on the first surface of the light transmission member for separating color light components of the light beam composed from the second lens; and
at least one third lens supported on at least one of the first and second surfaces of the light transmission member for diffracting the light beams emitted from the color filter, to emit the diffracted light beams to the scan mirror.

23. The optical system as set forth in claim 22, wherein the scan mirror includes a first one-dimensional scan mirror scanning incident light beams horizontally and a second one-dimensional scan mirror scanning incident light beams vertically, or includes a two-dimensional scan mirror scanning incident light beams horizontally and vertically.

24. The optical system as set forth in claim 22, wherein the scan mirror is a galvano mirror.

25. An optical system of a portable projector comprising:
a light transmission member having first and second surfaces;

a light source device for emitting light beams onto the first surface of the light transmission member, so as to allow the light beams to be transmitted into the light transmission member;

one or more first optical elements supported on at least one of the first and second surfaces of the light transmission member for diffracting and reflecting the light beams incident from the light source device;

at least one display element supported on at least one of the first and second surfaces of the light transmission member for reproducing an image upon receiving the light beams diffracted and reflected from the first optical elements; and at least one second optical element supported on at least one of the first and second surfaces of the light transmission member for enlarging and emitting the image reproduced from the display element, wherein the first optical elements include:

at least one light splitter supported on the first surface of the light transmission member for transmitting a specific wavelength of the light beams emitted from the light source device;

a first lens placed on a surface of the light splitter facing the light source device for diffracting the light beams emitted from the light source device; and at least one second lens supported on at least one of the first and second surfaces of the light transmission member for diffracting the light beams emitted from the light splitter, to emit the diffracted light beams to the display element, wherein a first surface of the first lens, on which the light beams are incident, has a grating angle for converging the light beams, and a second surface of the first lens, from which the light beams are emitted, has a rating angle for changing the path of the light beams.

26. An optical system of a portable projector comprising:

a light transmission member having first and second surfaces;

a light source device for emitting light beams onto the first surface of the light transmission member, so as to allow the light beams to be transmitted into the light transmission member; one or more first optical elements supported on at least one of the first and second surfaces of the light transmission member for diffracting and reflecting the light beams incident from the light source device;

at least one display element supported on at least one of the first and second surfaces of the light transmission member for reproducing an image upon receiving the light beams diffracted and reflected from the first optical elements; and at least one second optical element supported on at least one of the first and second surfaces of the light transmission member for enlarging and emitting the image reproduced from the display element, wherein the first optical elements include:

at least one light splitter supported on the first surface of the light transmission member for transmitting a specific wavelength of the light beams emitted from the light source device;

a first lens placed on a surface of the light splitter facing the light source device for diffracting the light beams emitted from the light source device;

a plate placed on a surface of the first lens facing the light source device, and having an irregular surface pattern for removing speckle noise of the light beams emitted from the light source device; and at least one second lens supported on at least one of the first and second surfaces of the light transmission member for diffracting the light beams emitted from the light splitter, to emit the diffracted light beams to the display element.

27. The optical system as set forth in claim 26, wherein the light splitter, first lens, and plate are integrally formed with one another.

28. The optical system as set forth in claim 26, further comprising:

a drive for simultaneously reciprocating the light splitter, first lens, and plate in one direction.

29. The optical system as set forth in claim 28, wherein the drive is an electromagnetic element or piezoelectric element.

30. The optical system as set forth in claim 26, wherein the plate has an area larger than that of the light splitter or the first lens.

31. An optical system of a portable projector comprising:

a light transmission member having first and second surfaces;

a light source device for emitting light beams onto the first surface of the light transmission member, so as to allow the light beams to be transmitted into the light transmission member; one or more first optical elements supported on at least one of the first and second surfaces of the light transmission member for diffracting and reflecting the light beams incident from the light source device;

at least one display element supported on at least one of the first and second surfaces of the light transmission member for reproducing an image upon receiving the light beams diffracted and reflected from the first optical elements; and at least one second optical element supported on at least one of the first and second surfaces of the light transmission member for enlarging and emitting the image reproduced from the display element, wherein the first optical elements include:

at least one first lens supported on the first surface of the light transmission member for diffracting the light beams emitted from the light source device;

a second lens supported on the second surface of the light transmission member for composing the light beams diffracted from the first lens;

a color filter supported on the first surface of the light transmission member for separating color light components of the light beam composed from the second lens; and at least one third lens supported on at least one of the first and second surfaces of the light transmission member for diffracting the light beams emitted from the color filter, to emit the diffracted light beams to the display element.

32. The optical system as set forth in claim 31, wherein the second optical element is a projection lens or mirror for enlarging and projecting the image reproduced from the display element.

33. A mobile communication terminal using an optical system, the optical system including a light transmission member and a plurality of optical elements attached to the light transmission member for reproducing and emitting an image from incident light beams, the mobile communication terminal comprising:

a body having a plurality of keypads and a hole;

a cover having a display panel and configured to be connected to the body;

the light transmission member mounted in the body at a side surface of the body through which the hole is perforated, the light transmission member being adapted to emit the light beams reproducing the image to the outside of the body through the hole; and a light source device mounted in the body for emitting the light beams to the optical elements attached to at least one surface of the light transmission member, wherein the optical elements include:

at least one light splitter supported on a first surface of the light transmission member for transmitting a specific wavelength of the light beams emitted from the light source device;

a first lens placed on a surface of the light splitter facing the light source device for diffracting the light beams emitted from the light source device; and at least one second lens supported on at least one of the first surface and a second surface of the light transmission member for diffracting the light beams emitted from the light splitter, to emit the diffracted light beams to the display element, wherein a first surface of the first lens, on which the light beams are incident, has a grating angle for converging the light beams, and a second surface of the first lens, from which the light beams are emitted, has a grating angle for changing the path of the light beams.

34. The mobile communication terminal as set forth in claim 33, further comprising:

a housing containing the light transmission member and light source device therein;

a hole perforated through a side location of the housing for allowing the light beams reproducing the image from the light transmission member to the outside of the housing; and a plurality of knurls formed at an outer peripheral surface of the housing around the hole.

* * * * *